US011002898B2

United States Patent
Peng et al.

(10) Patent No.: US 11,002,898 B2
(45) Date of Patent: May 11, 2021

(54) SWITCHABLE REFLECTIVE CIRCULAR POLARIZER IN HEAD-MOUNTED DISPLAY

(71) Applicant: Facebook Technologies, LLC, Menlo Park, CA (US)

(72) Inventors: Fenglin Peng, Kirkland, WA (US); Ying Geng, Bellevue, WA (US); Yusufu Njoni Bamaxam Sulai, Snohomish, WA (US); Mengfei Wang, Seattle, WA (US); Lu Lu, Kirkland, WA (US); Jacques Gollier, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/657,337

(22) Filed: Oct. 18, 2019

(65) Prior Publication Data

US 2020/0049872 A1 Feb. 13, 2020

Related U.S. Application Data

(63) Continuation of application No. 16/057,686, filed on Aug. 7, 2018, now Pat. No. 10,495,798.

(51) Int. Cl.
*G02B 5/30* (2006.01)
*G02B 27/01* (2006.01)
(Continued)

(52) U.S. Cl.
CPC ............. *G02B 5/3025* (2013.01); *G02B 5/30* (2013.01); *G02B 27/01* (2013.01);
(Continued)

(58) Field of Classification Search
CPC .. G02B 27/01; G02B 27/0977; G02B 27/283; G02B 2027/0138; G02B 2027/0174;
(Continued)

(56) References Cited

U.S. PATENT DOCUMENTS

| 5,627,666 A | 5/1997 | Sharp et al. |
| 5,796,454 A | 8/1998 | Ma |

(Continued)

FOREIGN PATENT DOCUMENTS

| WO | 2020032942 A1 | 2/2020 |
| WO | 2020032943 A1 | 2/2020 |

OTHER PUBLICATIONS

U.S. Appl. No. 16/057,686, "Corrected Notice of Allowance", dated Oct. 22, 2019, 4 pages.

(Continued)

*Primary Examiner* — Hoan C Nguyen
(74) *Attorney, Agent, or Firm* — Weaver Austin Villeneuve & Sampson LLP

(57) ABSTRACT

Disclosed herein are techniques for displaying images on multiple image planes in a near-eye display system. A switchable optical device includes a first polarizer configurable to polarize incident light into light of a first circular polarization state, and a second polarizer configurable to transmit light of a second circular polarization state and reflect light of the first circular polarization state into light of the first circular polarization state. The switchable optical device also includes a partial reflector positioned between the first polarizer and the second polarizer. The partial reflector is configured to transmit light from the first polarizer and reflect light from the second polarizer, where the reflected light and the light from the second polarizer have different polarization states. At least one of the first polarizer or the second polarizer includes a cholesteric liquid crystal (CLC) circular polarizer that is switchable by a voltage signal.

20 Claims, 20 Drawing Sheets

(51) Int. Cl.
   *G02F 1/1335*   (2006.01)
   *G02F 1/137*    (2006.01)
   *G02B 27/09*    (2006.01)
   *G02F 1/13363*  (2006.01)
   *G02B 5/32*     (2006.01)

(52) U.S. Cl.
   CPC ..... *G02B 27/0172* (2013.01); *G02B 27/0977* (2013.01); *G02F 1/13718* (2013.01); *G02F 1/133528* (2013.01); *G02F 1/133536* (2013.01); *G02F 1/133555* (2013.01); *G02B 5/32* (2013.01); *G02B 27/017* (2013.01); *G02B 2027/0178* (2013.01); *G02F 2001/133538* (2013.01); *G02F 2001/133541* (2013.01); *G02F 2001/133543* (2013.01); *G02F 2001/133557* (2013.01); *G02F 2001/133638* (2013.01)

(58) Field of Classification Search
   CPC .... G02B 17/0605; G02B 27/017; G02B 5/32; G02B 5/3025; G02B 27/0081; G02B 5/30; G02B 27/0172; G02B 2027/0178; G02F 1/13718; G02F 1/133536; G02F 1/133555; G02F 1/133528; G02F 2001/133538; G02F 2001/133541; G02F 2001/133638; G02F 2001/133557; G02F 2001/133543
   See application file for complete search history.

(56) References Cited

U.S. PATENT DOCUMENTS

| | | | |
|---|---|---|---|
| 6,147,734 A | 11/2000 | Kashima | |
| 9,151,959 B2* | 10/2015 | Dike | ................ G02B 27/28 |
| 10,379,419 B1 | 8/2019 | Lu et al. | |
| 10,429,647 B2 | 10/2019 | Gollier et al. | |
| 10,429,656 B1 | 10/2019 | Sharma et al. | |
| 10,429,657 B1 | 10/2019 | Sharma et al. | |
| 10,429,927 B1 | 10/2019 | Sharma et al. | |
| 10,451,885 B2 | 10/2019 | Lu et al. | |
| 10,495,798 B1 | 12/2019 | Peng et al. | |
| 10,642,048 B2 | 5/2020 | Peng et al. | |
| 2002/0030776 A1 | 3/2002 | Khan et al. | |
| 2003/0160923 A1* | 8/2003 | Ma | ............... G02F 1/13718 349/115 |
| 2004/0008302 A1 | 1/2004 | Moon | |
| 2010/0177113 A1 | 7/2010 | Gay et al. | |
| 2011/0037922 A1* | 2/2011 | O'Neill | ............... G02B 6/0055 349/62 |
| 2012/0062846 A1 | 3/2012 | Dike | |
| 2015/0301249 A1 | 10/2015 | Pau et al. | |
| 2015/0370074 A1 | 12/2015 | McDowall et al. | |
| 2016/0109714 A1 | 4/2016 | Chen | |
| 2016/0363770 A1 | 12/2016 | Kim et al. | |
| 2016/0377868 A1 | 12/2016 | Ouderkirk et al. | |
| 2017/0227777 A1 | 8/2017 | Carollo et al. | |
| 2017/0227791 A1 | 8/2017 | Von Und Zu Liechtenstein | |
| 2017/0242258 A1 | 8/2017 | Edwards | |
| 2018/0063508 A1 | 3/2018 | Trail et al. | |
| 2018/0101020 A1 | 4/2018 | Gollier et al. | |
| 2019/0018235 A1* | 1/2019 | Ouderkirk | ............... B29C 45/14 |
| 2019/0243147 A1* | 8/2019 | Smithwick | ............ G02B 27/10 |
| 2019/0353906 A1* | 11/2019 | Gollier | ................ G02B 5/3016 |
| 2019/0369390 A1* | 12/2019 | Gollier | ............... G02B 27/0018 |
| 2019/0377184 A1* | 12/2019 | Sharp | ................. G02B 27/286 |
| 2020/0049992 A1 | 2/2020 | Peng et al. | |

OTHER PUBLICATIONS

U.S. Appl. No. 16/057,692, "Notice of Allowance", dated Jan. 8, 2020, 9 pages.
U.S. Appl. No. 16/057,686, "Notice of Allowance", dated Jul. 25, 2019, 13 pages.
U.S. Appl. No. 16/057,692, "Non-Final Office Action", dated Jul. 22, 2019, 14 pages.
PCT/US2018/045808, "International Search Report and Written Opinion", dated May 7, 2019, 11 pages.
PCT/US2018/045811, "International Search Report and Written Opinion", dated Apr. 30, 2019, 11 pages.
Notice of Allowance dated Jan. 8, 2020 in U.S. Appl. No. 16/057,692.

* cited by examiner

SWITCHABLE REFLECTIVE CIRCULAR POLARIZER IN HEAD-MOUNTED DISPLAY

CROSS-REFERENCE TO RELATED APPLICATION

This application is a continuation of U.S. Non-Provisional application Ser. No. 16/057,686, filed Aug. 7, 2018, titled "SWITCHABLE REFLECTIVE CIRCULAR POLARIZER IN HEAD-MOUNTED DISPLAY," the disclosure of which is hereby incorporated by reference in its entirety for all purposes.

BACKGROUND

An artificial reality system, such as a head-mounted display (HMD) or heads-up display (HUD) system in the form of a headset or a pair of glasses, generally includes a near-eye display configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

The near-eye display system may include an optical system configured to form an image of a computer-generated image on an image plane. The optical system of the near-eye display may relay the image generated by an image source (e.g., a display panel) to create a virtual image that appears to be away from the image source and further than just a few centimeters away from the eyes of the user. For example, the optical system may collimate the light from the image source or otherwise convert spatial information of the displayed virtual objects into angular information to create a virtual image that may appear to be far away. The optical system may also magnify the image source to make the image appear larger than the actual size of the image source. In many cases, the applications of artificial reality systems are limited due to, for example, the cost, size, weight, limited field of view, small eye box, or poor efficiency of the optical systems used to relay the images generated by the image source.

SUMMARY

This disclosure relates generally to folded optical systems for near-eye display. A reflective circular polarizer (CP) may be used in a folded optical system to replace a reflective linear polarizer and a wave plate that are aligned, thus avoiding the alignment of the reflective linear polarizer and the wave plate. The reflective circular polarizer can reflect circularly polarized light while keeping the handedness of the reflected light the same as that of the incident light. The reflective circular polarizer can be made using, for example, cholesteric liquid crystal (CLC). In some embodiments, the reflective circular polarizer can be switchable such that the folded optical system may have different optical powers and may be able to relay the displayed images on different image planes.

In some embodiments, a switchable optical device may include a first polarizer configurable to polarize incident light into light of a first circular polarization state, a second polarizer configurable to transmit light of a second circular polarization state and reflect light of the first circular polarization state into light of the first circular polarization state, and a partial reflector positioned between the first polarizer and the second polarizer. The partial reflector may be configured to transmit light from the first polarizer and reflect light from the second polarizer, where the reflected light and the light from the second polarizer may have different polarization states. At least one of the first polarizer or the second polarizer may include a cholesteric liquid crystal (CLC) circular polarizer that is switchable by a voltage signal.

In some embodiments of the switchable optical device, at least one of the first polarizer, the second polarizer, or the partial reflector may be on a curved surface. In some embodiments, the curved surface may be a surface of an optical lens.

In some embodiments of the switchable optical device, the cholesteric liquid crystal (CLC) circular polarizer may include a plurality of layers, each layer having a different reflection wavelength range. In some embodiments, each of the plurality of layers may have a different pitch.

In some embodiments, the first polarizer or the second polarizer is configured to transmit both the light of the first circular polarization state and the light of the second circular polarization state upon receiving the voltage signal. In some embodiments, the first polarizer may be configured to polarize the incident light into light of the second circular polarization state upon receiving the voltage signal. In some embodiments, the first circular polarization state may be left-handed circular polarization, and the second circular polarization state may be right-handed circular polarization.

In some embodiments, the cholesteric liquid crystal (CLC) circular polarizer may include liquid crystal molecules arranged in a left-handed or a right-handed cholesteric helical structure. In some embodiments, the liquid crystal molecules may be configured to align with an electrical field applied in the CLC circular polarizer.

In some embodiments, the first polarizer, the partial reflector, and the second polarizer may form a folded lens. The folded lens may have a first optical power when the voltage signal is not applied to the CLC circular polarizer, and the folded lens may have a second optical power that is different from the first optical power when the voltage signal is applied to the CLC circular polarizer.

In some embodiments, a method of displaying images on multiple image planes may include polarizing light from a first image into light of a first circular polarization state using a first polarizer, transmitting the light of the first circular polarization state to a second polarizer by a partial reflector, reflecting the light of the first circular polarization state back to the partial reflector by the second polarizer, reflecting the light of the first circular polarization state into light of a second circular polarization state back to the second polarizer by the partial reflector, transmitting the light of the second circular polarization state to a user's eye by the second polarizer, applying a voltage signal on the second polarizer to cause the second polarizer to transmit light of any circular polarization state, and transmitting light from a second image to the user's eye by the second polarizer. In some embodiments, the second polarizer may include a cholesteric liquid crystal (CLC) reflective circular polarizer.

In some embodiments, the method may further include polarizing the light from the second image into light of the first circular polarization state by the first polarizer, and transmitting the light of the first circular polarization state in the light from the second image to the second polarizer by the partial reflector. Transmitting the light from the second image to the user's eye may include transmitting the light of the first circular polarization state in the light from the second image to the user's eye.

In some embodiments, the method may further include applying a second voltage signal on the first polarizer to cause the first polarizer to transmit light of any circular polarization state, and transmitting the light from the second image to the second polarizer by the first polarizer and the partial reflector, where transmitting the light from the second image to the user's eye may include transmitting light of any circular polarization state in the light from the second image to the user's eye.

According to certain embodiments, a method of operating a near-eye display device in a display mode and a see-through mode may include disconnecting a first polarizer from a voltage signal to set the near-eye display device to the display mode, polarizing light from a displayed image into light of a first circular polarization state by a second polarizer, transmitting the light of the first circular polarization state to the first polarizer by a partial reflector, reflecting the light of the first circular polarization state back to the partial reflector by the first polarizer, reflecting the light of the first circular polarization state into light of a second circular polarization state back to the first polarizer by the partial reflector, transmitting the light of the second circular polarization state to a user's eye by the first polarizer, connecting the first polarizer to the voltage signal to set the near-eye display device to the see-through mode (where the voltage signal causes the first polarizer to transmit light of any circular polarization state), and transmitting ambient light to the user's eye by the first polarizer.

In some embodiments, the method of operating the near-eye display device may further include polarizing the ambient light into light of the first circular polarization state by the second polarizer, and transmitting the light of the first circular polarization state in the ambient light to the first polarizer by the partial reflector, where transmitting the ambient light to the user's eye may include transmitting the light of the first circular polarization state in the ambient light to the user's eye. In some embodiments, the method may further include applying a second voltage signal on the second polarizer to cause the second polarizer to transmit light of any circular polarization state, and transmitting ambient light of any circular polarization state to the first polarizer by the second polarizer and the partial reflector, where transmitting the ambient light to the user's eye may include transmitting the ambient light of any circular polarization state to the user's eye. In some embodiments, in the see-through mode, the near-eye display device may have a non-zero optical power and functions as a vision correction lens.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
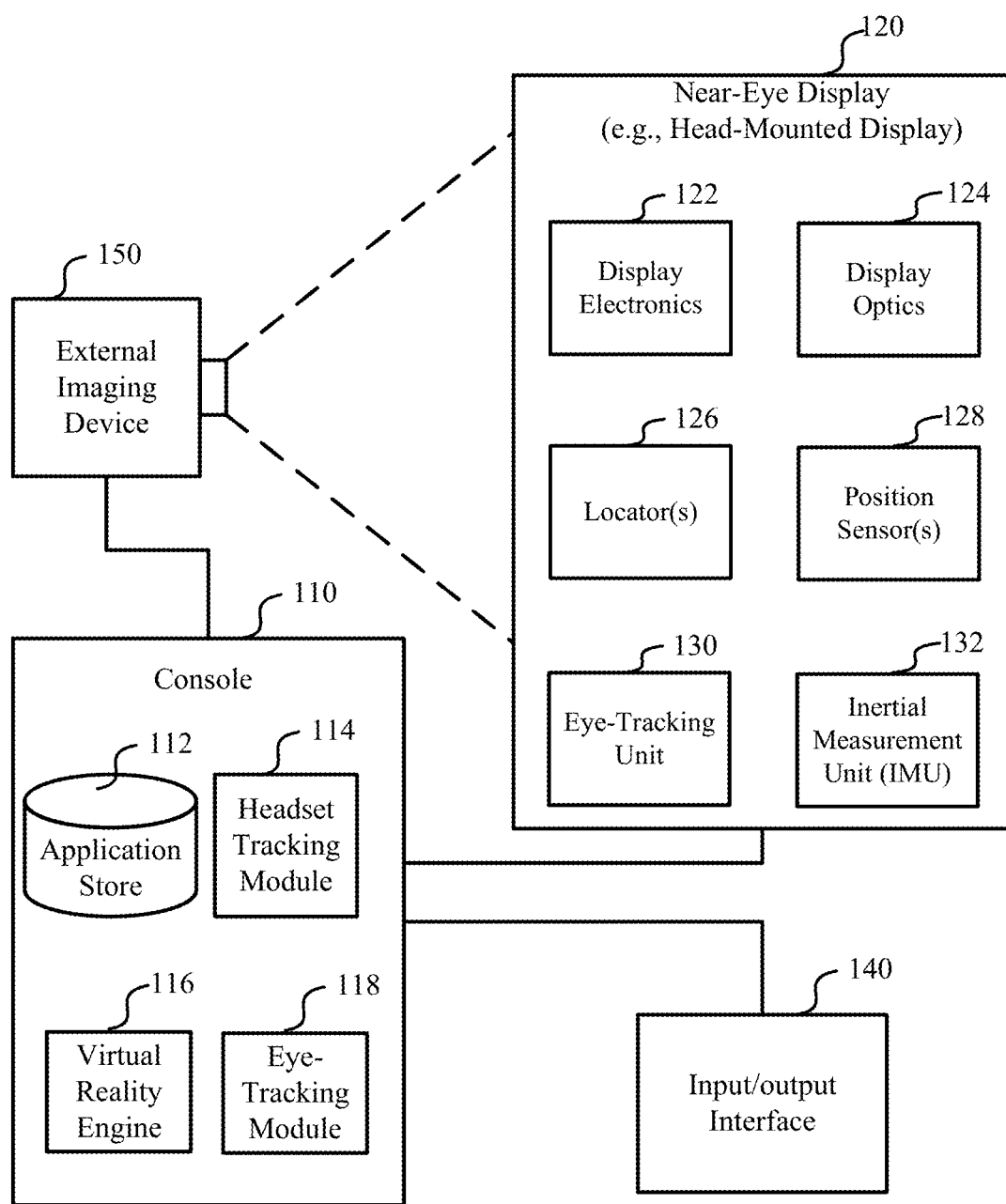
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to folded optics in near-eye display. According to some embodiments, a reflective circular polarizer (CP) may be used in the folded optics to replace a reflective linear polarizer and a wave plate that are aligned, thus avoiding the alignment of the reflective linear polarizer and the wave plate. The reflective circular polarizer may be configured to reflect light of a first circular polarization state (e.g., left-handed or right-handed circular polarization) while keeping the handedness of the reflected light same as that of the incident light. The reflective circular polarizer may transmit light of a second circular polarization state without changing its polarization state. Display light from a display device can be polarized into light of the first circular polarization state, which may keep its polarization state while it pass through a 50/50 mirror and is reflected by the reflective circular polarizer back to a 50/50 mirror. The 50/50 mirror may reflect the light of the first circular polarization state into light of the second circular polarization state back to the reflective circular polarizer. The reflective circular polarizer may then let the light of the second circular polarization state reflected from the 50/50 mirror to pass through with little or no loss. In this way, display light of the first circular polarization state from the display device may be folded by the optical system and reach the user's eye as light of the second polarization state.

In some embodiments, the reflective circular polarizer may be implemented using cholesteric liquid crystal. The polarization state of the light being reflected may be determined by the handedness of the cholesteric helical superstructure formed by the liquid crystal molecules. Multiple layers of cholesteric liquid crystal may be used to improve the reflectivity of the reflective circular polarizer. Layers of cholesteric liquid crystal with different pitches (or periods) may be used to reflect light of different wavelengths.

In addition, the orientation (or alignment) of the liquid crystal molecules in the reflective circular polarizer may be changed or realigned by applying an voltage signal on the reflective circular polarizer, such that the liquid crystal molecules may align with the electrical field to transmit light of any polarization. As such, the operation of the HMD may be switched between the display mode (with reflection by the reflective circular polarizer) and the see-through mode (without reflection by the reflective circular polarizer) by applying voltages with different levels or polarities.

In one embodiment, when no voltage is applied to the reflective circular polarizer, display light may be polarized to a first circular polarization state (e.g., left-handed or right-handed) using, for example, a circular polarizer. The display light of the first circular polarization state may pass through a partial reflection mirror, such as a 50/50 mirror, and then be reflected back to the 50/50 mirror by the reflective circular polarizer without changing the polarization state of the reflected light. The 50/50 mirror may reflect the display light of the first circular polarization state into light of a second circular polarization state (e.g., right-handed or left-handed) that can be transmitted by the reflective circular polarizer. Thus, the reflective circular polarizer may help to fold the light in the display mode to project the displayed image on an image plane. When a voltage signal is applied on the reflective circular polarizer, the liquid crystal molecules may be aligned with the electrical field, and thus light of any polarization state can pass through without being folded. In this way, the folded optics can be used for both the display mode and the see-through mode without compromising the quality of the image in the see-through mode.

According to certain embodiments, two reflective circular polarizers and a partial reflection mirror, such as a 50/50 mirror or a partial mirror with a reflectivity greater than or less than 50%, may be used to change the optical power of a folded optical device. For example, when no voltage is applied to the reflective circular polarizer, light of a first circular polarization state may pass through the first reflective circular polarizer and the 50/50 mirror and reach the second reflective circular polarizer, which may reflect the light of the first circular polarization state back to the 50/50 mirror. The 50/50 mirror may reflect the display light of the first circular polarization state into light of a second circular polarization state that can be transmitted by the reflective circular polarizer. Thus, the folded optical device may fold the light of the first circular polarization state, and thus may have a first optical power for light of the first circular polarization state in the display light. When a voltage signal is applied across at least one of the two reflective circular polarizers, the liquid crystal molecules within the reflective circular polarizer may be aligned with the electrical field, and thus light of any polarization state can pass through the reflective circular polarizer without being folded. Thus, the folded optical device may have a second optical power when the voltage signal is applied. In this way, the folded optical device may achieve different optical powers to relay images on different image planes.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

I. Near-Eye Display

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140 that may each be coupled to an optional console 110. While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audios, or some combination thereof. In some embodiments, audios may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form factor, including a pair of glasses. Some embodiments of near-eye display 120 are further described below with respect to FIGS. 2, 3, and 20. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, a micro light emitting diode (mLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124.

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to artificial reality engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light. In some embodiments, at least some of the functions of eye-tracking module 118 may be performed by eye-tracking unit 130.

Figure 2:
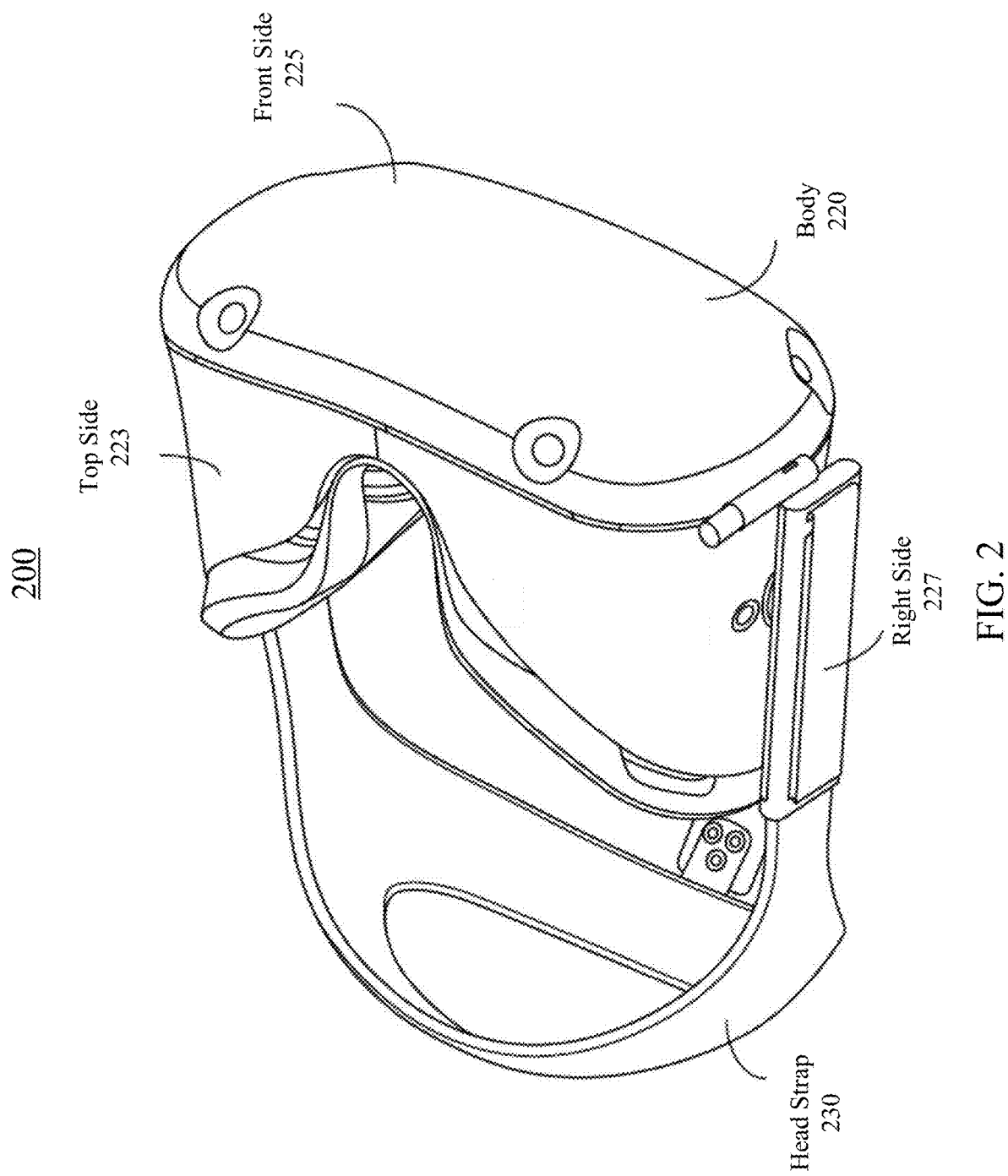
FIG. 2 is a perspective view of an example of a near-eye display device in the form of a head-mounted display (HMD) device for implementing some of the examples disclosed herein.

FIG. 2 is a perspective view of an example of a near-eye display in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
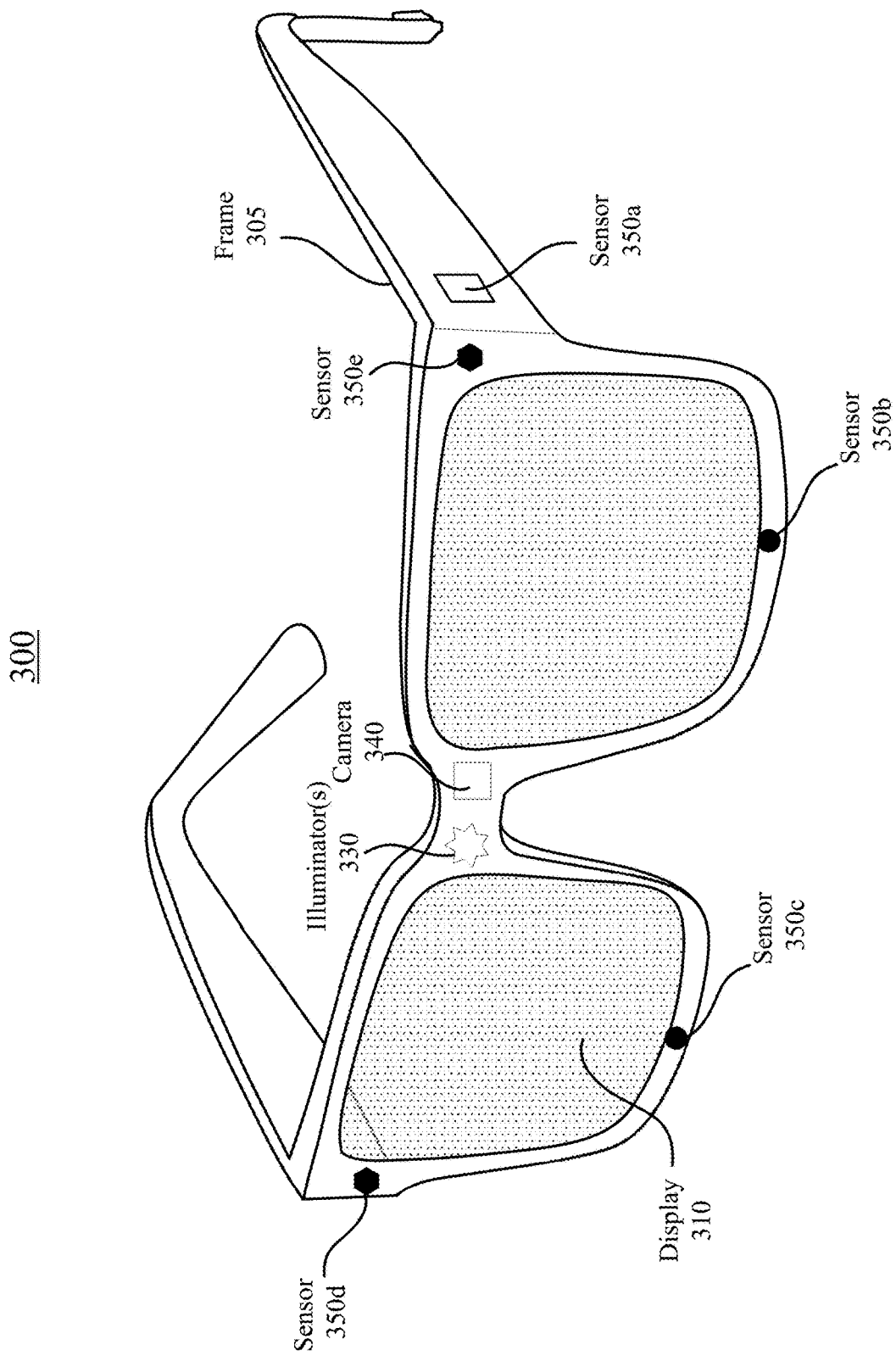
FIG. 3 is a perspective view of a simplified example of a near-eye display device in the form of a pair of glasses for implementing some of the examples disclosed herein.

FIG. 3 is a perspective view of a simplified example near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
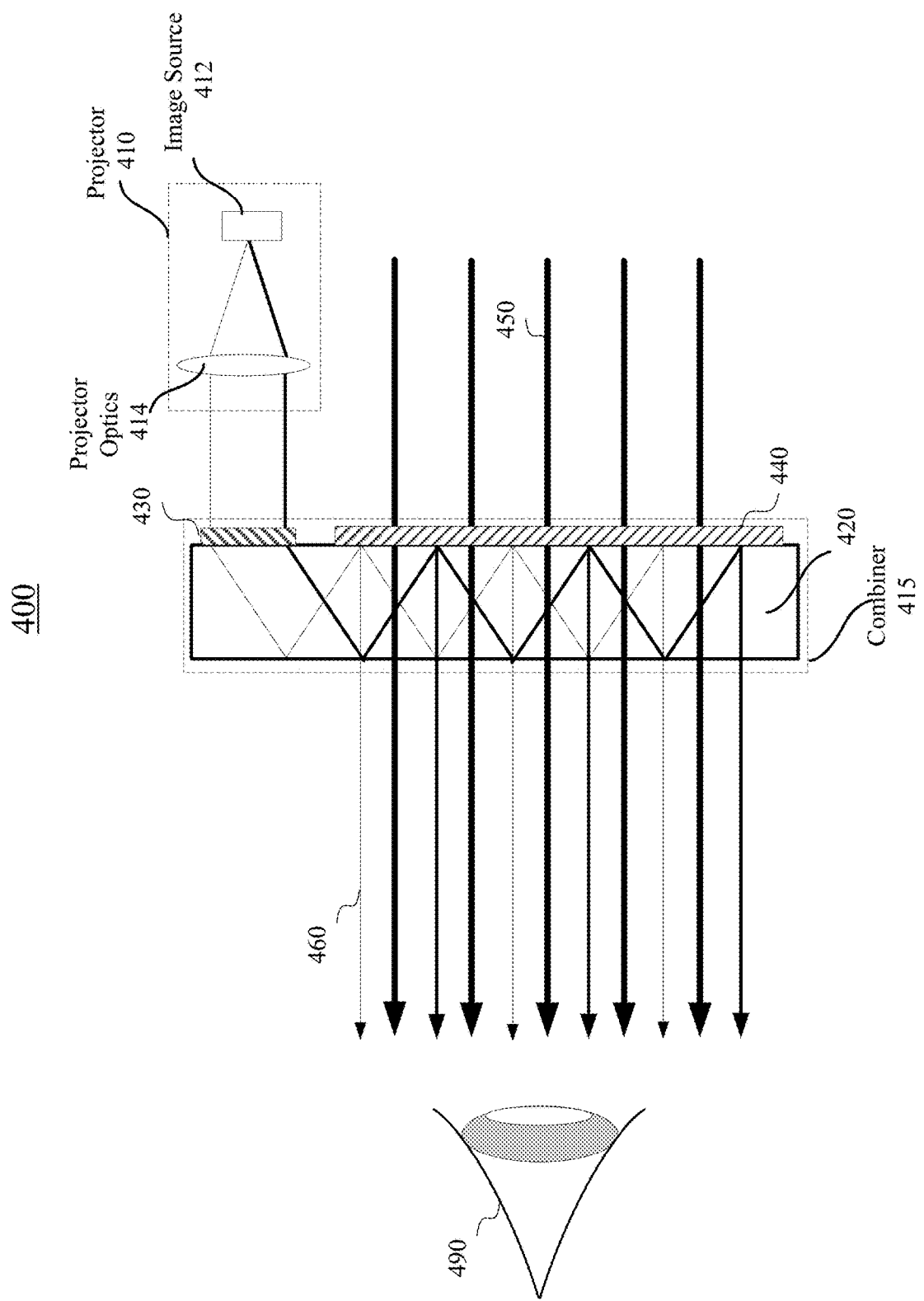
FIG. 4 illustrates an example of an optical see-through augmented reality system using a waveguide display according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical elements (DOE) (e.g., a surface-relief grating), or a refractive coupler (e.g., a wedge or a prism). Input coupler 430 may have a coupling efficiency of greater than 30%, 50%, 75%, 90%, or higher for visible light. As used herein, visible light may refer to light with a wavelength between about 380 nm to about 750 nm. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light. A material may be "transparent" to a light beam if the light beam can pass through the material with a high transmission rate, such as larger than 50%, 40%, 75%, 80%, 90%, 95%, or higher, where a small portion of the light beam (e.g., less than 50%, 40%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

Figure 5:
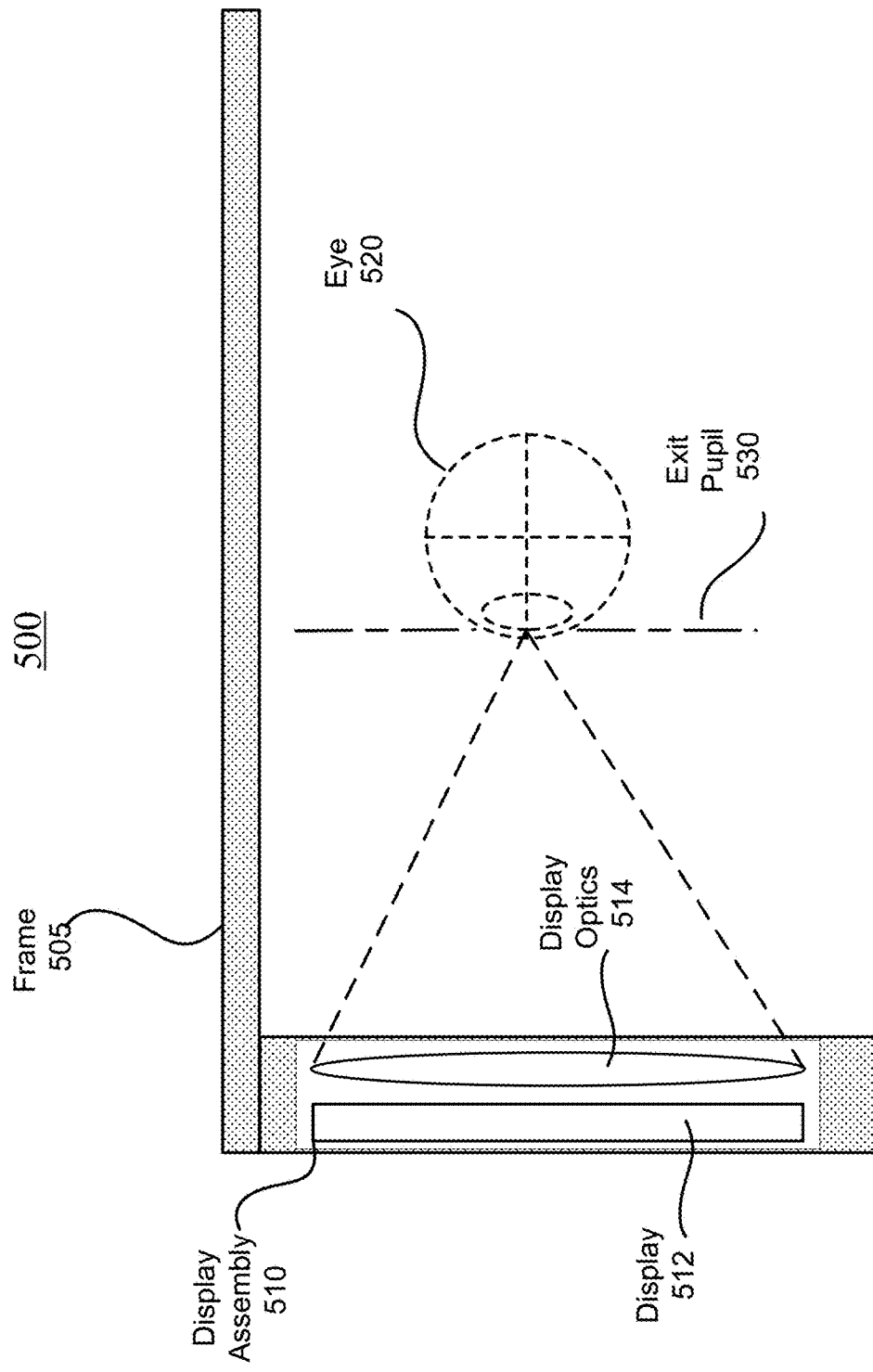
FIG. 5 is a cross-sectional view of an example of a near-eye display according to certain embodiments.

FIG. 5 is a cross-sectional view of an example of a near-eye display 500 according to certain embodiments. Near-eye display 500 may include at least one display assembly 510. Display assembly 510 may be configured to direct image light (i.e., display light) to an eyebox located at exit pupil 530 and to user's eye 520. It is noted that, even though FIG. 5 and other figures in the present disclosure show an eye of a user of a near-eye display for illustration purposes, the eye of the user is not a part of the corresponding near-eye display.

As HMD device 200 and near-eye display 300, near-eye display 500 may include a frame 505 and a display assembly 510 that includes a display 512 and/or display optics 514 coupled to or embedded in frame 505. As described above, display 512 may display images to the user electrically (e.g., using LCD) or optically (e.g., using an waveguide display and optical couplers) according to data received from a console, such as console 110. Display 512 may include sub-pixels to emit light of a predominant color, such as red, green, blue, white, or yellow. In some embodiments, display assembly 510 may include a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display may also be a polychromatic display that can be projected on multiple planes (e.g. multi-planar colored display). In some configurations, the stacked waveguide display may be a monochromatic display that can be projected on multiple planes (e.g. multi-planar monochromatic display). The varifocal waveguide display is a display that can adjust a focal position of image light emitted from the waveguide display. In alternate embodiments, display assembly 510 may include the stacked waveguide display and the varifocal waveguide display.

Display optics 514 may be similar to display optics 124 and may display image content optically (e.g., using optical waveguides and optical couplers), correct optical errors associated with the image light, combine images of virtual objects and real objects, and present the corrected image light to exit pupil 530 of near-eye display 500, where the user's eye 520 may be located at. Display optics 514 may also relay the image to create virtual images that appear to be away from the image source and further than just a few centimeters away from the eyes of the user. For example, display optics 514 may collimate the image source to create a virtual image that may appear to be far away and convert spatial information of the displayed virtual objects into angular information. Display optics 514 may also magnify the image source to make the image appear larger than the actual size of the image source. More detail of the display optics is described below.

II. Display Optics

In various implementations, the optical system of a near-eye display, such as an HMD, may be pupil-forming or non-pupil-forming. Non-pupil-forming HMDs may not use intermediary optics to relay the displayed image, and thus the user's pupils may serve as the pupils of the HMD. Such non-pupil-forming displays may be variations of a magnifier (sometimes referred to as "simple eyepiece"), which may magnify a displayed image to form a virtual image at a greater distance from the eye. The non-pupil-forming display may use fewer optical elements. Pupil-forming HMDs may use optics similar to, for example, optics of a compound microscope or telescope, and may include an internal aperture and some forms of projection optics that magnify an intermediary image and relay it to the exit pupil. The more complex optical system of the pupil-forming HMDs may allow for a larger number of optical elements in the path from the image source to the exit-pupil, which may be used to correct optical aberrations and generate focal cues, and may provide design freedom for packaging the HMD. For example, a number of reflectors (e.g., mirrors) may be inserted in the optical path so that the optical system may be folded or wrapped around to fit in a compact HMD.

Figure 6:
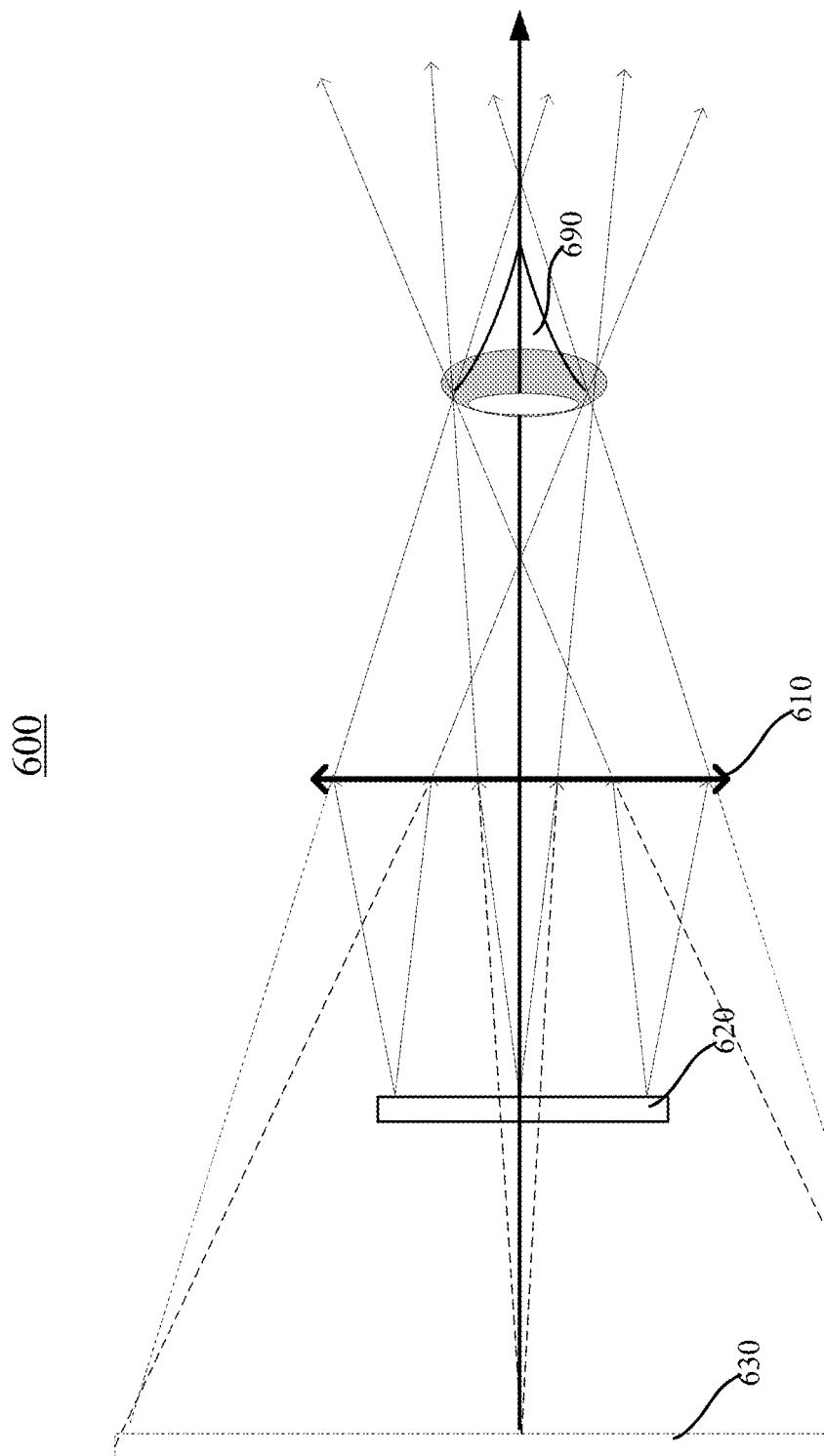
FIG. 6 illustrates an example of an optical system for near-eye display according to certain embodiments.

FIG. 6 illustrates an example of an optical system 600 with a non-pupil-forming configuration for a near-eye display device according to certain embodiments. Optical system 600 may include projector optics 610 and an image source 620. Projector optics 610 may function as a magnifier. FIG. 6 shows that image source 620 is in front of projector optics 610. In some other embodiments, image source 620 may be located outside of the field of view of a user's eye 690. For example, one or more reflectors or directional couplers as shown in, for example, FIG. 4, may be used to reflect light from an image source to make the image source appear to be at the location of image source 620 shown in FIG. 6. Thus, image source 620 may be similar to image source 412 described above. Light from an area (e.g., a pixel or a light emitting source) on image source 620 may be directed to user's eye 690 by projector optics 610. Light directed by projector optics 610 may form virtual images on an image plane 630. The location of image plane 630 may be determined based on the location of image source 620 and the focal length of projector optics 610. User's eye 690 may form a real image on the retina of user's eye 690 using light directed by projector optics 610. In this way, objects at different spatial locations on image source 620 may appear to be objects on an image plane far away from user's eye 690 at different viewing angles.

Figure 7:
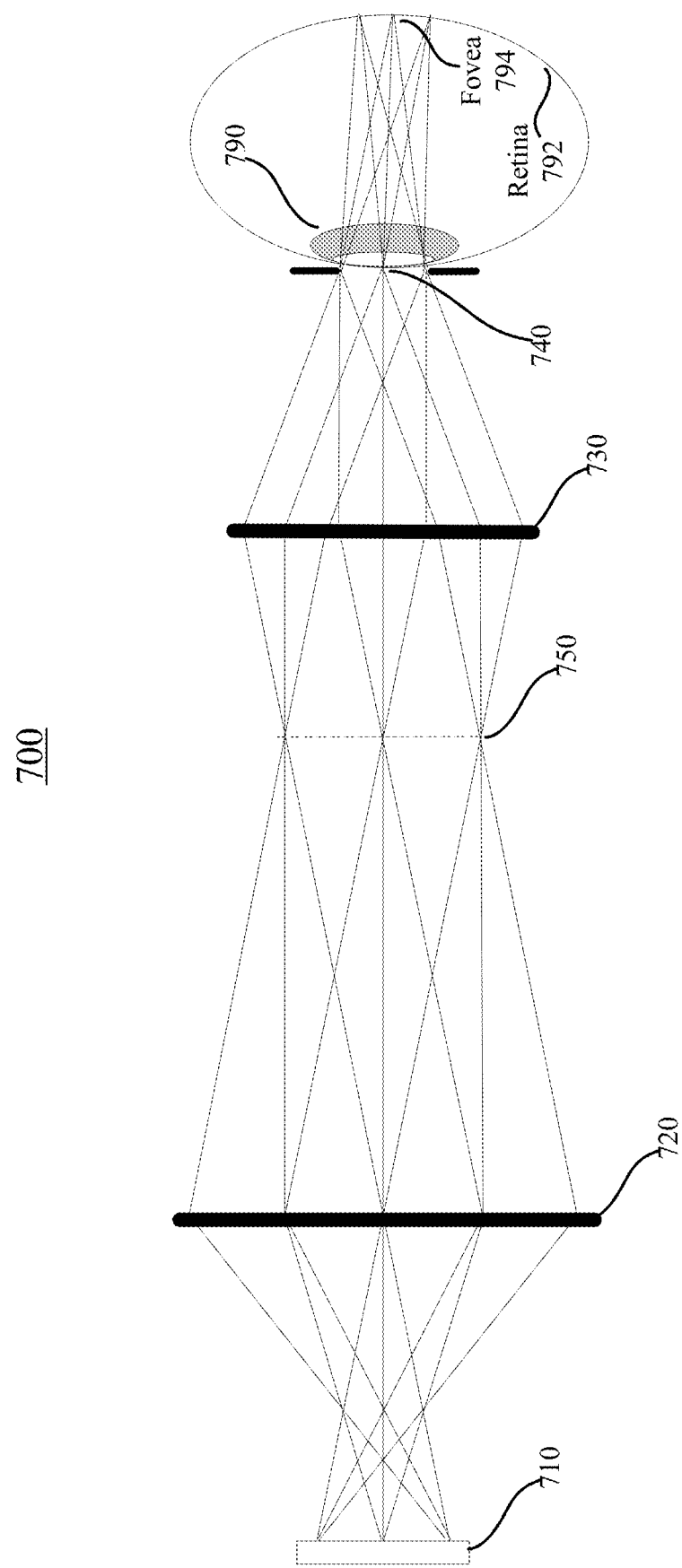
FIG. 7 illustrates an example of an optical system for near-eye display according to certain embodiments.

FIG. 7 illustrates an example of an optical system 700 with a pupil forming configuration for a near-eye display device according to certain embodiments. Optical system 700 may include an image source 710, a first relay lens 720, and a second relay lens 730. Even though image source 710, first relay lens 720, and second relay lens 730 are shown as in front of a user's eye 790, one or more of them may be physically located outside of the field of view of user's eye 790 when, for example, one or more reflectors or directional couplers are used to change the propagation direction of the light. Image source 710 may be similar to image source 412 described above. First relay lens 720 may include one or more lenses, and may produce an intermediate image 750 of image source 710. Second relay lens 730 may include one or more lenses, and may relay intermediate image 750 to an exit pupil 740. As shown in FIG. 7, objects at different spatial locations on image source 710 may appear to be objects far away from the user's eye 790 at different viewing angles. The light from different angles may then be focused by the eye onto different locations on retina 792 of user's eye 790. For example, at least some portion of the light may be focused on fovea 794 on retina 792.

Optical system 600 and optical system 700 may be large and heavy if implemented using conventional optics. In some implementations, folded optics including reflective optical elements may be used to implement compact HMD systems with a large field of view.

III. Folded Lens

Figure 8:
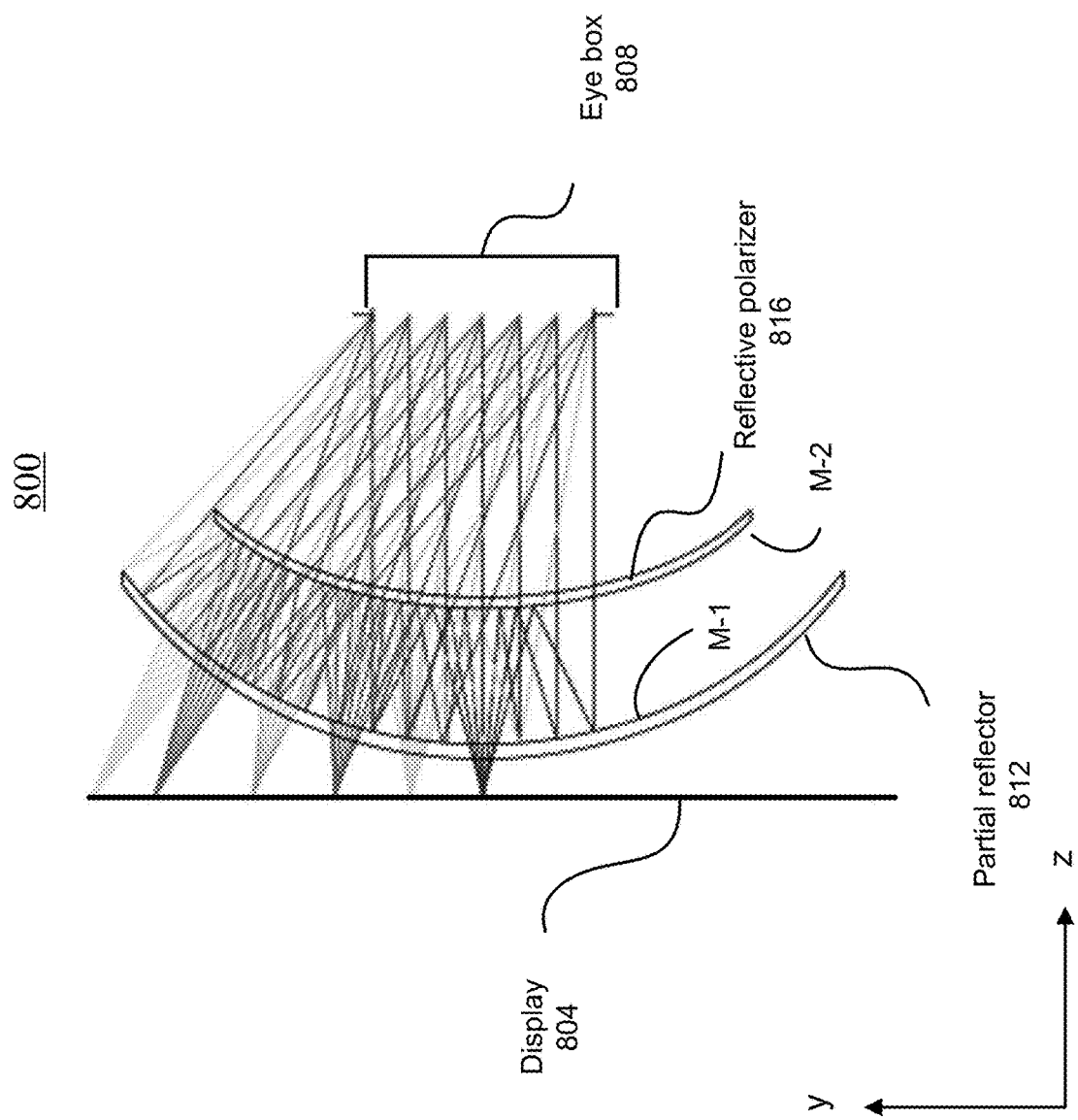
FIG. 8 depicts an embodiment of a folded-lens system according to certain embodiments.

FIG. 8 shows an embodiment of a folded-lens system 800 comprising a first lens M-1 (or a curved substrate) and a second lens M-2 (or a curved substrate). Light from a display 804 may be relayed to an eye box 808 by folded-lens system 800. First lens M-1 may include a partial reflector 812 formed on it. Partial reflector 812 may have a transmissivity T that is equal to or greater than 20% or 40% and equal to or less than 60% or 90% (e.g., a 50/50 mirror with T=50%+/−2, 5, or 10%). Second lens M-2 may include a reflective polarizer 816 formed on it. Folded-lens system 800 may also include a quarter-wave plate (not shown in FIG. 8) between first lens M-1 and second lens M-2. As shown in FIG. 8, light emitted from display 804 may be transmitted by partial reflector 812 (e.g., half of the light may be transmitted through partial reflector 812) and first lens M-1, reflected off reflective polarizer 816 on second lens M-2, reflected off partial reflector 812 and first mirror M-1, and then transmitted through reflective polarizer 816 to eye box 808. In this way, light may be folded within the cavity formed by partial reflector 812 and reflective polarizer 816 to increase the effective optical path and achieve a desired optical power with a compact form factor.

Figure 9:
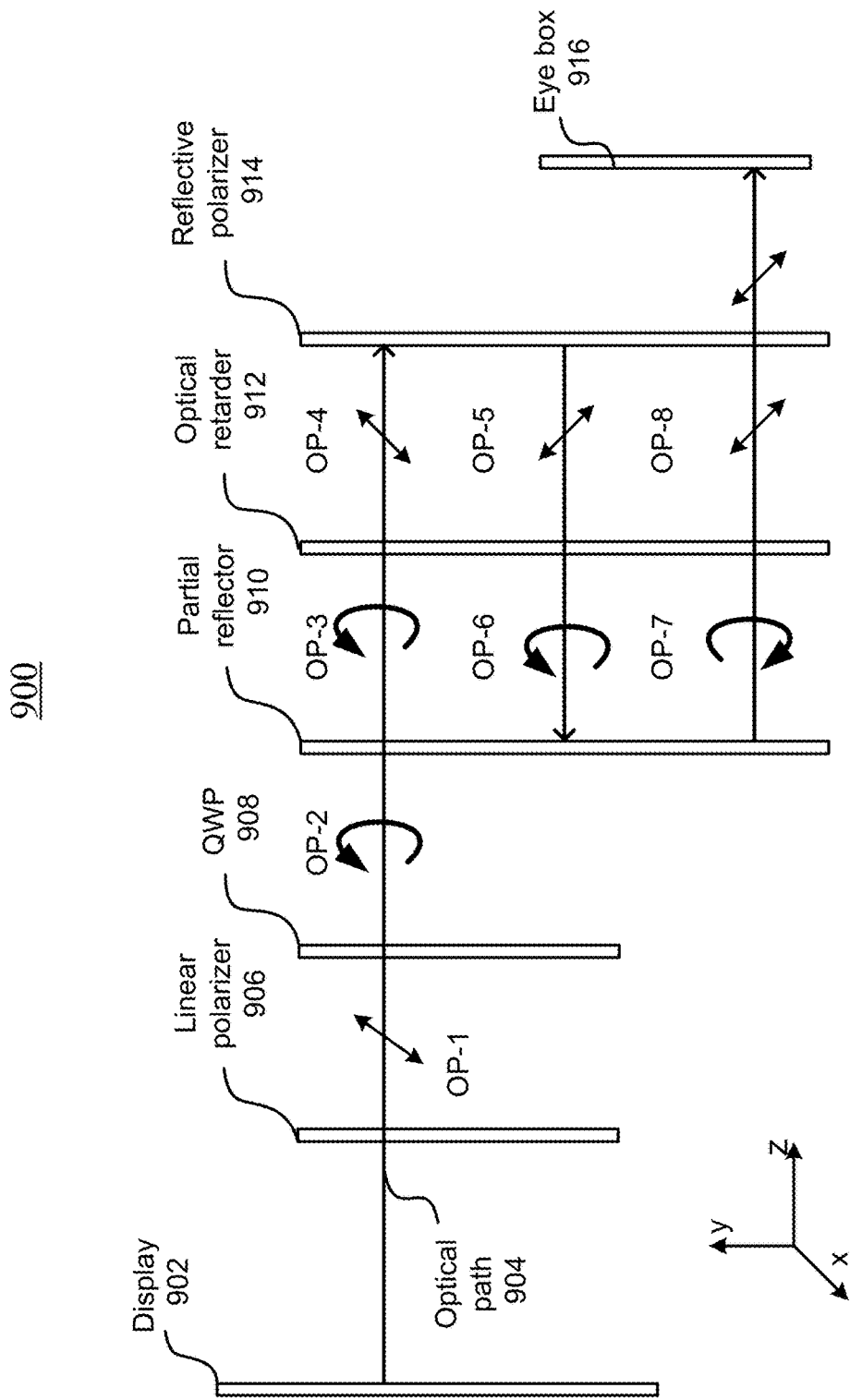
FIG. 9 illustrates an embodiment of a folded-lens system according to certain embodiments.

FIG. 9 illustrates an embodiment a folded-lens system 900. Folded-lens system 900 may be a specific implementation of folded-lens system 800. Even though the components of folded-lens system 900 are shown as flat components in FIG. 9, at least some of the components may have a curved shape. For example, at least some of the components may be formed on a curved surface, such as a surface of a lens or a curved substrate as shown in, for example, FIG. 8.

In the example shown in FIG. 9, light from a display 902 travels along an optical path (OP) 904 to an eye box 916. Light from display 902 may first be converted to circularly polarized light. There may be several ways to generate circularly polarized light. One way is to use a quarter-wave plate after a linear polarizer, where the transmission axis of the linear polarizer is half way 45° between the fast and slow axes of the quarter-wave plate. The unpolarized light can be linearly polarized by the linear polarizer, and the linearly polarized light can be transformed into circularly polarized light by the quarter wave plate. For example, as shown in FIG. 9, light at a first portion OP-1 of optical path 904 is linearly polarized after transmitting from display 902 through a linear polarizer 906 (e.g., an absorptive polarizer or a beam-splitting polarizer). For example, the light may be polarized at 45 degrees with respect to the x axis in an x/y plane, wherein the z axis is a direction of light propagation. The linearly polarized light may pass through a quarter-wave plate (QWP) 908 and become circularly polarized along a second portion OP-2 of optical path 904. More specifically, a fast axis of QWP 908 may be aligned along they axis, and the light may become left-handed circularly polarized after passing through QWP 908.

The left-handed circularly polarized light may then pass through a partial reflector 910. After passing through the partial reflector 910, the polarization of the light does not change along a third portion OP-3 of optical path 904. After passing through an optical retarder 912, the light is changed back to linearly-polarized light (e.g., at 45 degrees with respect to the x axis) on a fourth portion OP-4 of optical path 904. For example, optical retarder 912 may be a second quarter-wave plate with axes rotated by 90 degrees from the axes of QWP 908.

Light from the fourth portion OP-4 of optical path 904 may be reflected off a reflective linear polarizer 914 that passes light linearly polarized at 135 degrees and reflects light linearly polarized at 45 degrees. After reflected by reflective linear polarizer 914, light from the fourth portion OP-4 of optical path 904 may become linearly polarized at 135 degrees at a fifth portion OP-5 of optical path 904 because the electric field at the reflection surface remains unchanged in the x/y plane yet the direction of beam propagation is flipped. Light reflected from reflective linear polarizer 914 may then pass through optical retarder 912 a second time and become circularly polarized (e.g., left handed) at a sixth portion OP-6 of optical path 904.

Light from the sixth portion OP-6 of optical path 904 is reflected (e.g., 50% reflected) and becomes oppositely (e.g., right-handed) circularly polarized at a seventh portion OP-7 of optical path 904. After passing through optical retarder 912 a third time, the light becomes linearly polarized at an eighth portion OP-8 of the optical path 904, with a polarization direction (e.g., at 135 degrees) orthogonal to the polarization direction (e.g., at 45 degrees) of the light at the fourth portion OP-4 of optical path 904. Light from the eighth portion OP-8 of optical path 904 is then transmitted through reflective linear polarizer 914 to eye box 916. Due to the double-reflection and triple-pass in the cavity between partial reflector 910 (e.g., on first lens M-1) and reflective linear polarizer 914 (e.g., on second lens M-2), the total physical length of the system can be reduced.

As shown in FIG. 9, the folded optics may use one or more polarizers and one or more wave plates to transmit and reflect light of certain polarization states within the folded optics so as to effectively "fold" the optical path. The folded optics may reduce the thickness and/or weight of the HMD, and may provide a wide field of view. However, the quality of the image displayed to a user's eye may be compromised (e.g., due to strong ghost images) if the polarizers and/or the wave plates are not precisely aligned. For example, linear polarizer 906 and QWP 908 may need to be aligned such that the polarization direction of linear polarizer 906 is half way (45 degrees) between the fast and slow axes of QWP 908 to generate circularly polarized light. QWP 908 and optical retarder 912 may need to be aligned such that the fast and slow axes of QWP 908 are aligned with the slow and fast axes of optical retarder 912, respectively, in order to make the light passing through optical retarder 912 on OP-4 linearly polarized. Otherwise, light passing through optical retarder 912 on OP-4 may not be linearly polarized, and at least a portion of the light may be transmitted through reflective linear polarizer 914 (instead of being fully reflected) to cause ghost images. Similarly, reflective linear polarizer 914 and optical retarder 912 may need to be aligned such that the polarization direction of reflective linear polarizer 914 is half way (45 degrees) between the fast and slow axes of optical retarder 912. In many cases, it may be difficult, costly, or time-consuming to properly align the optical components, which may also become misaligned during use even if they are precisely aligned initially. Thus, it is desirable to eliminate at least some of these optical components that may need precise alignments.

IV. Reflective Circular Polarizer

According to certain embodiments, a reflective circular polarizer may be used in the folded optics to replace a reflective linear polarizer and a wave plate that may need to be aligned, thus avoiding the alignment procedures. The reflective circular polarizer may be configured to reflect light of a first circular polarization state while keeping the handedness of the reflected light same as that of the incident light, and transmit light of a second (e.g., opposite) circular polarization state. In some embodiments, display light from a display device can be polarized to the first circular polarization state, and then pass through a partial reflector (e.g., a 50/50 mirror) and be reflected by the reflective circular polarizer back to the partial reflector. The partial reflector may reflect the light of the first circular polarization state into light of the second circular polarization state back to the reflective circular polarizer. The reflective circular polarizer may then let the light of the second circular polarization state reflected from the partial reflector to pass through. In this way, display light of the first circular polarization state from the display device may be folded by the optical system before reaching the user's eye as light of the second polarization state. In some implementations, linear polarizer 906 and QWP 908, which in combination circularly polarize the display light from the display device, may be replaced with a circular polarizer to further reduce the alignment requirements.

There may be many different ways to implement the reflective circular polarizer. In some embodiments, the reflective circular polarizer may be implemented using cholesteric liquid crystal (CLC) (also referred to as chiral liquid crystal). The polarization state of the light being reflected by the CLC circular polarizer may depend on the handedness of the cholesteric helical superstructure formed by the liquid crystal molecules. Multiple layers of cholesteric liquid crystal materials may be used to improve the reflectivity of the reflective circular polarizer. In some embodiments, multiple layers of cholesteric liquid crystal with different pitches (or periods) may be used to reflect light of different wavelengths. More details of the cholesteric liquid crystal-based reflective circular polarizer are described below.

In liquid crystal, the rod-like liquid crystal molecules are generally oriented with their moments of inertia roughly aligned along an axis called the director. Because of the anisotropic orientation of the liquid crystal molecules, physical properties of liquid crystals, such as the refractive index, elastic constant, viscosity, dielectric constant, thermal and electrical conductivity, etc., may also be anisotropic. Liquid crystals can also be made chiral. For example, an achiral LC host material may form a helical supra-molecular architecture if doped with a chiral material (often referred to as a chiral dopant). The liquid crystal molecules in the chiral liquid crystal may be tilted by a finite angle with respect to the layer normal in a layered structure. The chirality may induce a finite azimuthal twist from one layer to the next, producing a spiral twisting of the molecular axis along the layer normal direction. The distance over which the LC molecules undergo a full 360° twist is referred to as the chiral pitch p. The structure of the chiral liquid crystal repeats every half-pitch because the directors at 0° and ±180° are equivalent. The pitch p can be changed when the temperature is altered or when other molecules (e.g., the chiral dopant) are added to the liquid crystal host. Thus, the pitch can be tuned by doping the liquid crystal host with different materials or different concentrations of a material, such as the chiral dopant. In some liquid crystal devices, the pitch may be on the same order as the wavelength of visible light. Such CLC devices may exhibit unique optical properties, such as Bragg reflection and low-threshold laser emission. Furthermore, CLCs also present special electro-optic effects, for example, memory effect, grating effect, as well as the withdrawal effect of spiral.

Another structural parameter of the cholesteric liquid crystals is the twist sense, which determines the handedness of a helix (left- or right-handed). Due to the unique helical structures, cholesteric liquid crystals may exhibit particular optical properties, such as characteristics of selective light reflection, optical rotation effect, and circular dichroism, which distinguish them from the other liquid crystal materials. From the macroscopic perspective, the handedness determines the optical reflective characteristics of cholesteric liquid crystals. CLC molecules may form a spiral in space along the z-direction according to:

$$n(r) = \left\{ \begin{array}{c} \cos\left(\frac{2\pi}{p}z + \varphi_0\right) \\ \sin\left(\frac{2\pi}{p}z + \varphi_0\right) \\ 0 \end{array} \right\},$$

where p is the pitch of the helix and $\varphi_0$ is a constant that depends on the boundary conditions. This helical structure may lead to the reflection of circular polarized light with the handedness unchanged.

Figure 10:
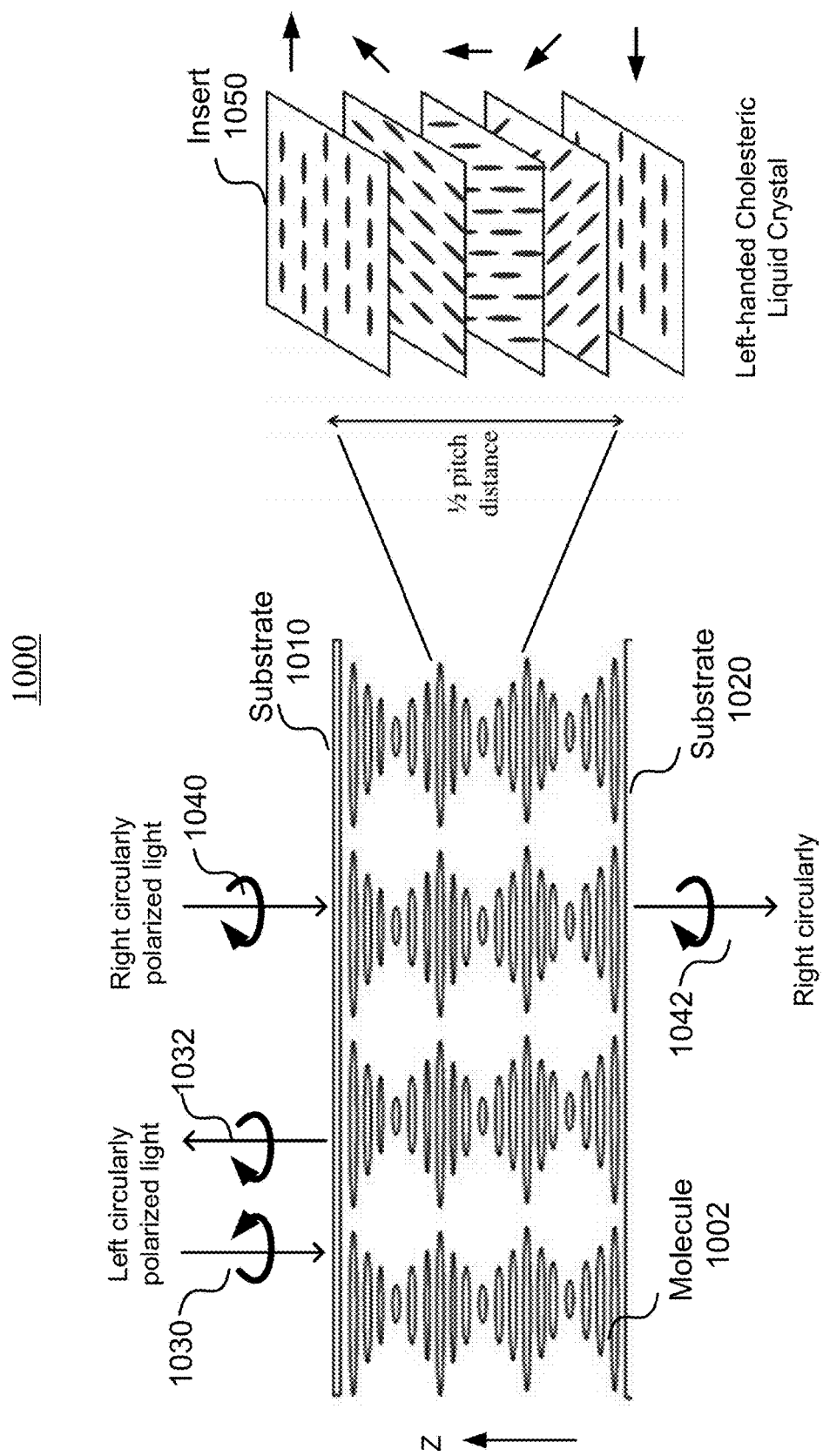
FIG. 10 illustrates an embodiment of a cholesteric liquid crystal circular polarizer with left-handed helixes according to certain embodiments.

FIG. 10 illustrates an embodiment of a cholesteric liquid crystal circular polarizer 1000 having a left-handed helical structure. Circular polarizer 1000 may include a plurality of layers embedded between a substrate 1010 and a substrate 1020. Insert 1050 shows a half pitch of the helical structure. As shown in the insert 1050, liquid crystal molecules 1002 in the plurality of layers may be tilted by different angles with respect to the layer normal (the z direction) and may produce a spiral twisting of the molecular axis along the layer normal. In the example shown in FIG. 10, the liquid crystal molecules form a left-handed helical structure. As such, left-handed circularly polarized light 1030 that is incident on circular polarizer 1000 may be reflected back as left-handed circularly polarized light 1032. On the other hand, right-handed circularly polarized light 1040 that is incident on circular polarizer 1000 may pass through circular polarizer 1000 as right-handed circularly polarized light 1042.

Figure 11:
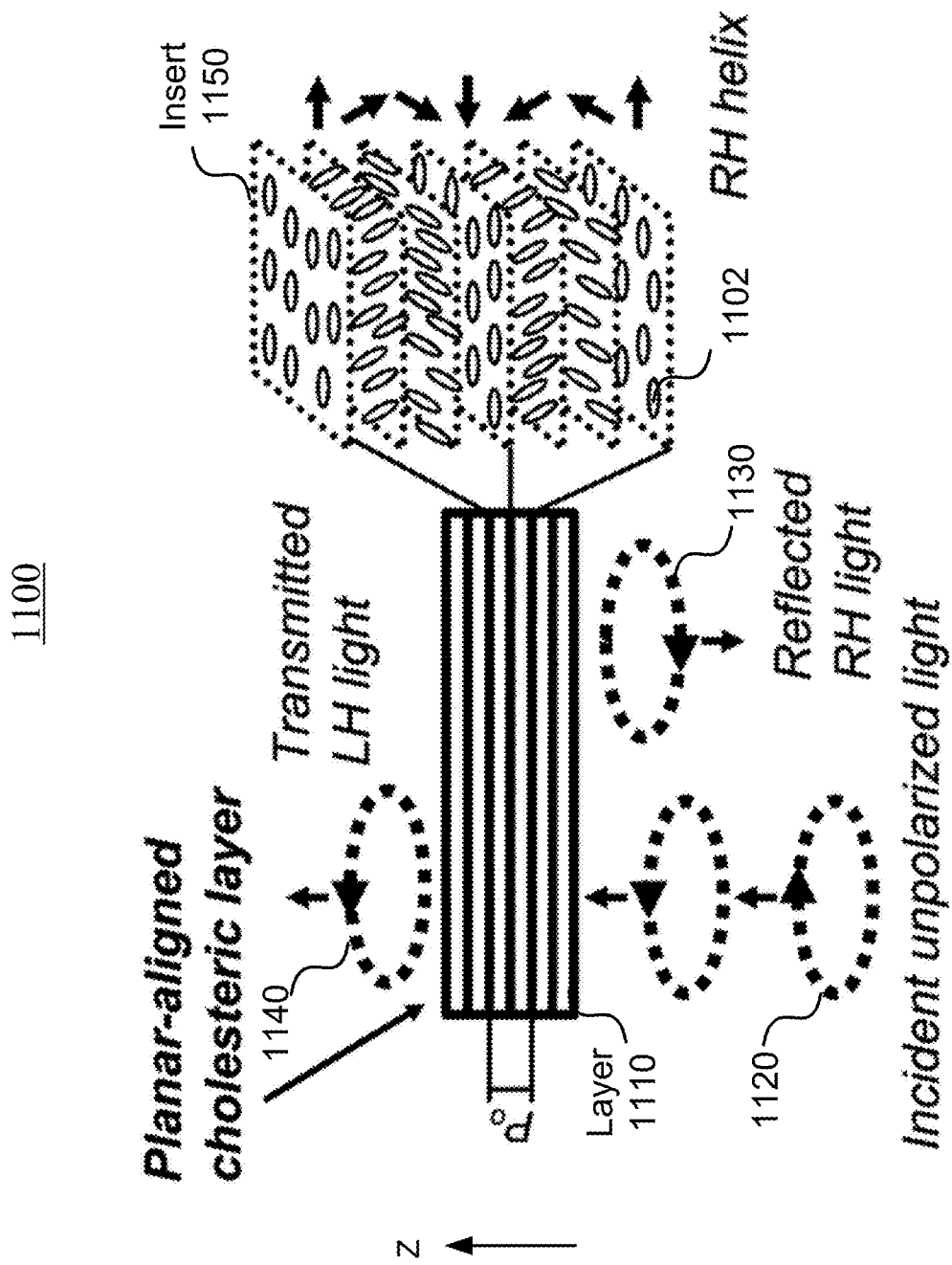
FIG. 11 illustrates an embodiment of a cholesteric liquid crystal circular polarizer with right-handed helixes according to certain embodiments.

FIG. 11 illustrates an embodiment of a cholesteric liquid crystal circular polarizer 1100 having a right-handed helical structure. Circular polarizer 1100 may include a plurality of layers 1110. Insert 1150 shows a half pitch of the helical structure. As shown in insert 1150, liquid crystal molecules 1102 in the plurality of layers 1110 may be tilted by different angles with respect to the layer normal (the z direction) and produce a spiral twisting of the molecular axis along the layer normal. In the example shown in FIG. 11, the liquid crystal molecules form a right-handed helical structure. As such, when unpolarized light 1120 that includes a right-handed circularly polarized component and a left-handed circularly polarized component is incident on circular polarizer 1100, the right-handed circularly polarized component may be reflected back as right-handed circularly polarized light 1130. In contrast, the left-handed circularly polarized component may pass through circular polarizer 1100 as left-handed circularly polarized light 1140.

Thus, the handedness of the circularly polarized light reflected by the circular polarizer may be selected by twisting the liquid crystal molecules in the circular polarizer according to a corresponding handedness. In contrast, a glass or metal reflector may reflect incident circularly polarized light such that the reflected circularly polarized light has an opposite handedness compared with the incident circularly polarized light. Such differences in reflective properties between the reflective CLC circular polarizer and a metal or glass reflector are shown in FIGS. 12A and 12B below.

Figures 12A, 12B:
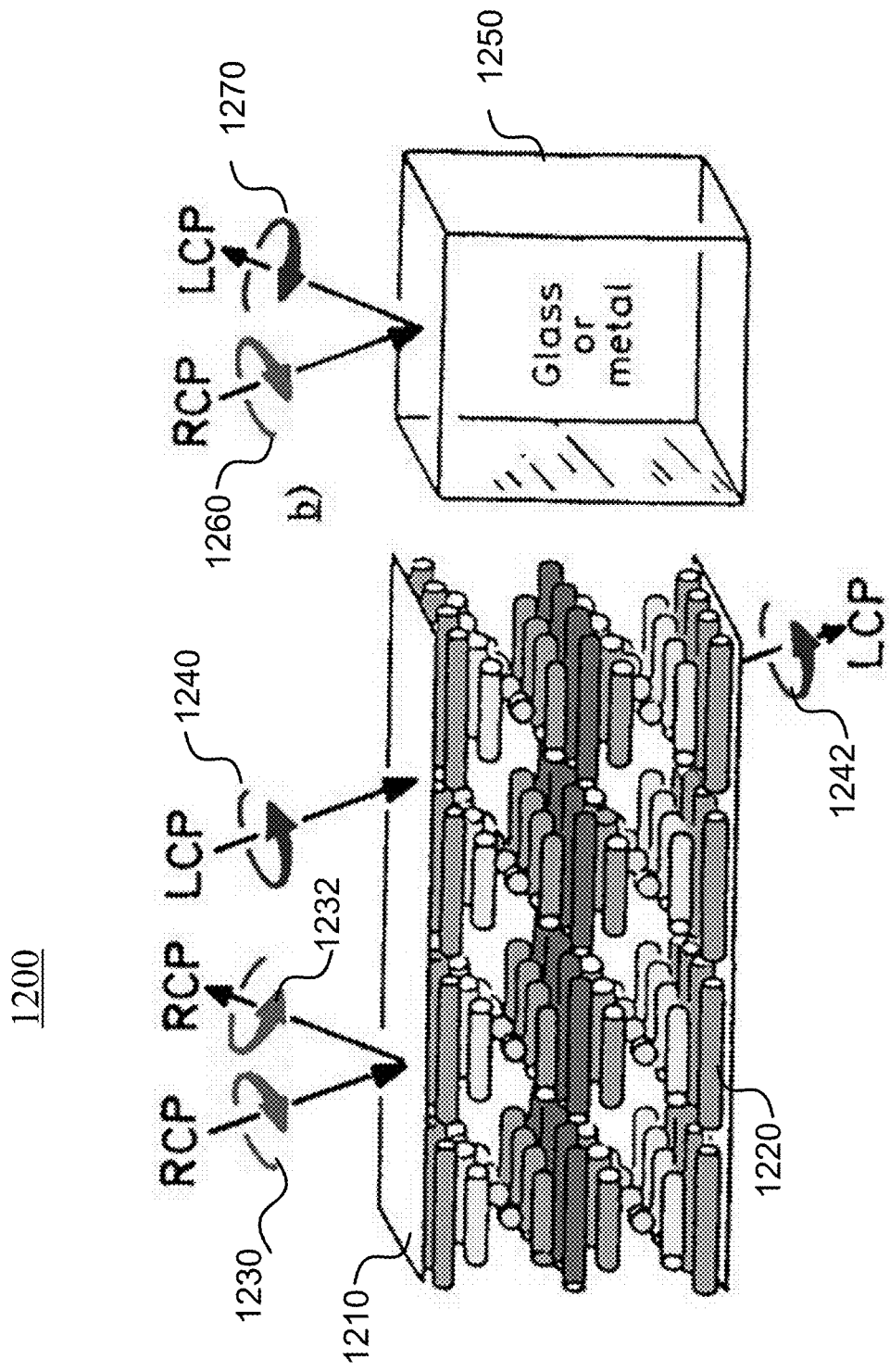
FIG. 12A illustrates an embodiment of a cholesteric liquid crystal based circular polarizer with right-handed helixes according to certain embodiments.
FIG. 12B illustrates the reflection of circularly polarized light by a glass or metal mirror.

FIG. 12A illustrates an embodiment of a cholesteric liquid crystal circular polarizer 1200 with right-handed helixes. Circular polarizer 1200 includes liquid crystal molecules 1220 embedded between two substrates 1210. Liquid crystal molecules 1220 form a right-handed helical structure. As such, right-handed circularly polarized light 1230 incident on circular polarizer 1200 may be reflected back as right-handed circularly polarized light 1232, while left-handed circularly polarized light 1240 incident on circular polarizer 1200 may pass through circular polarizer 1200 as left-handed circularly polarized light 1242.

FIG. 12B illustrates the reflection of circularly polarized light by a glass or metal mirror 1250. As illustrated, right-handed circularly polarized light 1260 incident on glass or metal mirror 1250 may be reflected back as left-handed circularly polarized light 1270.

Figure 13:
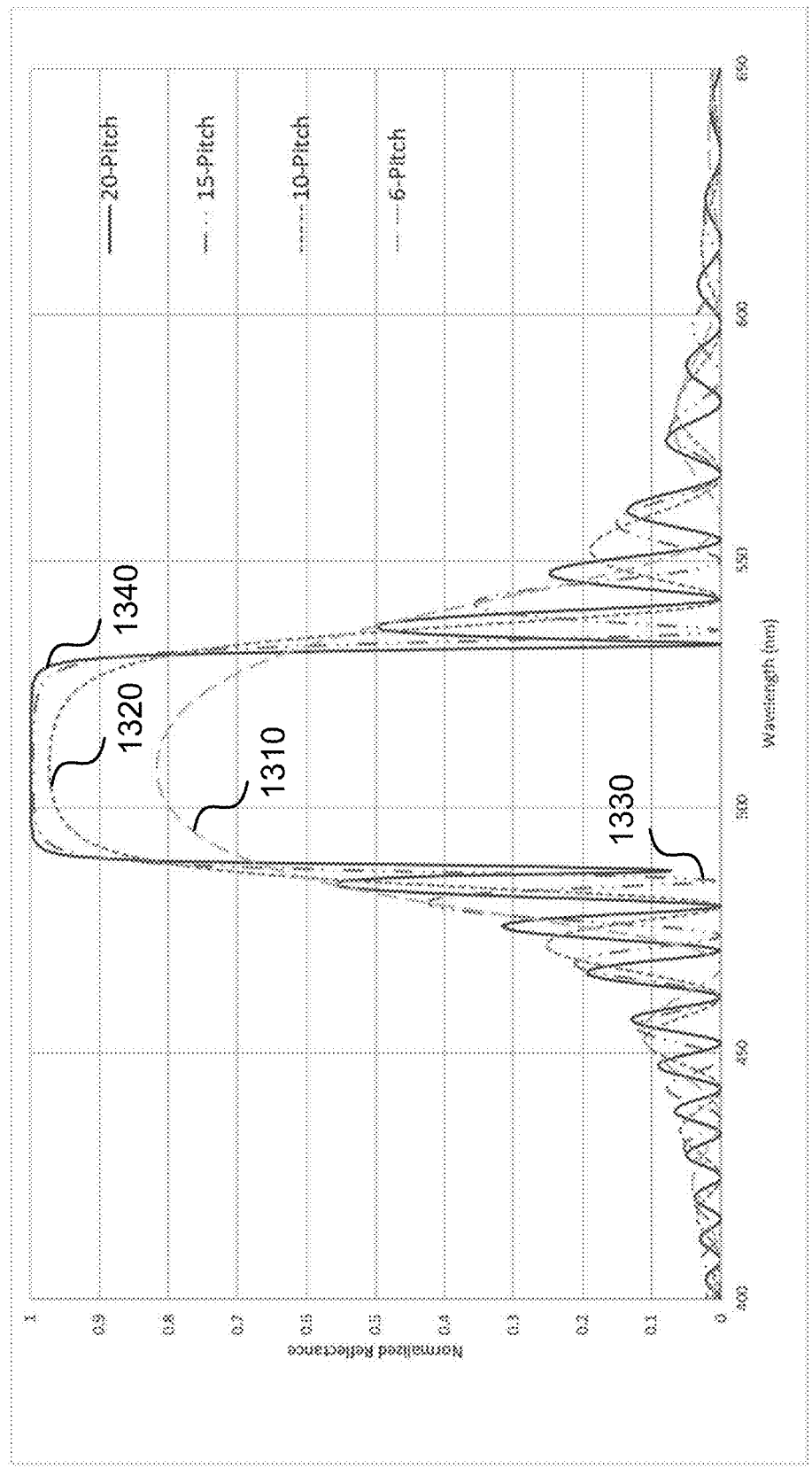
FIG. 13 illustrates selective reflection spectra of an example of an helical cholesteric structure according to certain embodiments.

FIG. 13 illustrates normalized selective reflection spectra of example cholesteric liquid crystal cells with various cell thicknesses. Due to the periodic change of the refractive indices arising from the helical structure, CLCs can selectively reflect the incident light based on the Bragg relationship. The central wavelength $\lambda$ and the wavelength range (i.e., the bandwidth) $\Delta\lambda$ of the selective reflection may be denoted as $\lambda = np$ and $\Delta\lambda = \Delta np$, respectively, where $n = (n_o + n_e)/2$ is the average of the ordinary ($n_o$) and the extraordinary ($n_e$) refractive indices of the locally uniaxial structure, p is the helical pitch, and $\Delta n = n_e - n_o$ is the birefringence. Within the reflection bandwidth, cholesteric liquid crystals with left-handed helical structures may allow right-handed circularly polarized light to go through and reflect left-handed circularly polarized light. Cholesteric liquid crystals with right-handed helical structures may allow left-handed circularly polarized light to go through and reflect right-handed circularly polarized light. Beyond the reflection bandwidth, both left-handed and right-handed circularly polarized light is transmitted. In addition, due to the polarization-selectivity property of the cholesteric liquid crystals, when an ordinary unpolarized light goes through CLCs, the maximum reflectivity is usually limited to 50%, and the other 50% or more may be transmitted through the cholesteric liquid crystals.

In the examples shown in FIG. 13, a first cholesteric liquid crystal cell may include 6 pitches, and the reflective spectrum of the first cholesteric liquid crystal cell is shown by curve 1310. Curve 1310 shows that the maximum normalized reflectivity of the first cholesteric liquid crystal cell in the visible light band is about 80% and the wavelength selectivity is not very good. A second cholesteric liquid crystal cell may include 10 pitches. The reflective spectrum of the second cholesteric liquid crystal cell is shown by curve 1320. Curve 1320 shows that the maximum normalized reflectivity of the second cholesteric liquid crystal cell in the visible light band is close to 95% and the wavelength selectivity is much better than the first cholesteric liquid crystal cell. Curves 1330 and 1340 show the reflective spectra of a third and fourth cholesteric liquid crystal cells that have a cell thickness of 15 and 20 pitches, respectively. As illustrated, the third and fourth cholesteric liquid crystal cells have a peak normalized reflectivity close to 100% and have a very good wavelength selectivity. Thus, light of one circular polarization state (e.g., right-handed or left-handed) may be almost all reflected, and thus the transmitted light may only include light of the opposite circular polarization state (e.g., left-handed or right-handed).

A cholesteric liquid crystal-based circular polarizer may be fabricated in various ways on a substrate, such as a transparent glass substrate. For example, the cholesteric liquid crystal-based circular polarizer may be formed using double twist cholesteric liquid crystal layers (where the liquid crystal molecules may twist along two directions, one perpendicular to the substrate and the other one parallel to the substrate) or liquid crystal polymer layers. In one embodiment, an alignment layer including a desired pattern may be formed on the substrate using, for example, photolithography, direct write (e.g., using e-beam), or holographic recording. A liquid crystal polymer thin film may be coated on the alignment layer. The liquid crystal polymer (or monomer) molecules may align according to the pattern on the alignment layer. A UV polymerization (or curing) process may be used to polymerize the liquid crystal polymer (or monomer) molecules, which may cause the liquid crystal molecules to be aligned to be parallel or perpendicular to incident linearly polarized UV light, and fix the liquid crystal molecules in the thin film. The coating and polymerization processes may be performed repeatedly to create the three-dimensional spiral structure of liquid crystal polymer molecules with a desired thickness (or number of pitches) in order to achieve a desired reflectivity.

V. Folded-Lens Using Circular Polarizer

The folded-lens system 800 or 900 may be simplified and improved using the CLC circular polarizers described above with respect to FIGS. 10-12. For example, a CLC circular polarizer can be used to replace linear polarizer 906 and QWP 908, or replace optical retarder 912 and reflective linear polarizer 914. Thus, the alignment between optical retarder 912 and reflective linear polarizer 914 may be eliminated because they are replaced by a single reflective circular polarizer. The alignment between linear polarizer 906 and QWP 908 may be eliminated if they are replaced by a single circular polarizer (e.g., a reflective or absorptive circular polarizer). The alignment between QWP 908 and reflective linear polarizer 914 (and optical retarder 912) can also be eliminated because the light transmitted or reflected by the circular polarizer is either left-handed circularly polarized light or right-handed circularly polarized light, rather than linearly polarized along a certain direction or angle.

Figure 14:
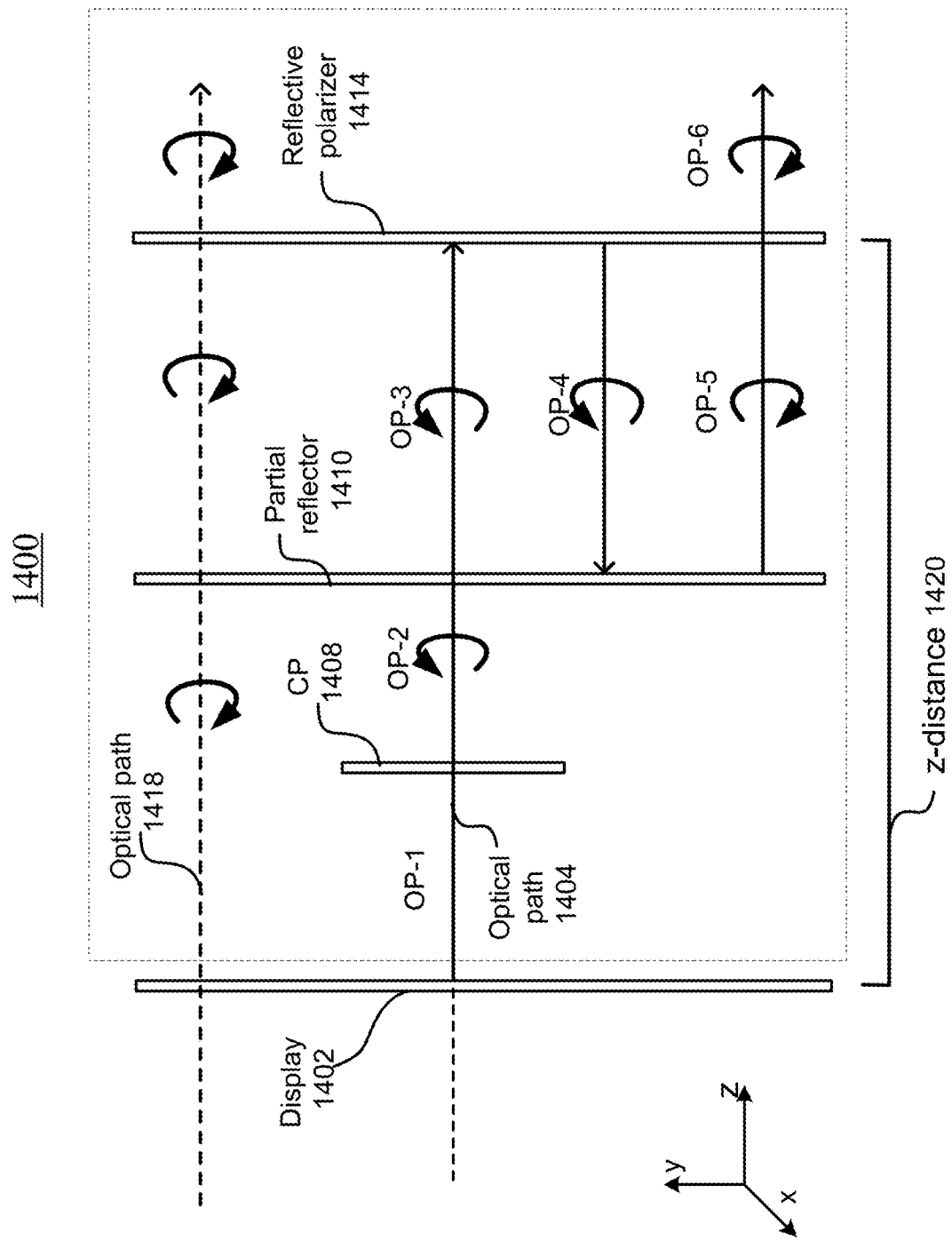
FIG. 14 illustrates an example of a folded-lens system including a reflective circular polarizer according to certain embodiments.

FIG. 14 illustrates an example of a folded-lens system 1400 including one or more circular polarizers according to certain embodiments. Folded-lens system 1400 may be used together with a display 1402. Light from display 1402 may travel through folded-lens system 1400 along an optical path (OP) 1404 to a user's eye. In a first portion OP-1 of optical path 1404, light from display 1402 may be unpolarized. The unpolarized light from display 1402 may first be converted to circularly polarized light by a circular polarizer 1408. In the example shown in FIG. 14, after passing through circular polarizer 1408, light from display 1402 becomes left-handed circularly polarized along a second portion OP-2 of optical path 1404.

After passing through a partial reflector 1410, the polarization state of the light does not change along a third portion OP-3 of optical path 1404. Light from third portion OP-3 of optical path 1404 may reach a reflective polarizer 1414, which may be a reflective CLC circular polarizer as described above. In the example shown in FIG. 14, reflective polarizer 1414 may include a left-handed circular polarizer and thus may reflective left-handed circularly polarized light while transmitting right-handed circularly polarized light as shown in FIG. 10. Left-handed circularly polarized light reflected by reflective polarizer 1414 may propagate along a fourth portion OP-4 of optical path 1404 before it reaches partial reflector 1410. Partial reflector 1410 may reflect left-handed circularly polarized light into right-handed circularly polarized light as described above with respect to, for example, FIG. 9 or FIG. 12B. Right-handed circularly polarized light reflected from partial reflector 1410 may propagate along a fifth portion OP-5 of optical path 1404 and reach reflective polarizer 1414 again. As described above, in the example shown in FIG. 14, reflective polarizer 1414 may be a left-handed circular polarizer that transmits right-handed circularly polarized light with little or no loss. After passing through reflective polarizer 1414, the right-handed circularly polarized light may propagate along a sixth portion OP-6 of optical path 1404 towards user's eyes.

Due to the double-reflection in the cavity formed by partial reflector 1410 and reflective polarizer 1414, light from display 1402 may pass through the cavity three times, and thus a total physical length of the system (including the distance between partial reflector 1410 and reflective polarizer 1414) can be reduced without reducing the optical length.

In various embodiments, any of circular polarizer 1408, partial reflector 1410, and reflective polarizer 1414 may have a flat or curved shape. For example, any of circular polarizer 1408, partial reflector 1410, and reflective polarizer 1414 may be formed on a flat or curved substrate. In some embodiments, any of circular polarizer 1408, partial reflector 1410, and reflective polarizer 1414 may be formed on a surface of a lens (e.g., a concave or convex lens) as described above with respect to FIG. 8.

VI. Folded-Lens for Display Mode and See-Through Mode

In some applications, it may be desirable that a near-eye display system can be used in both (1) a display mode (e.g., in VR or AR applications) where images from an near-eye display device (e.g., various LCD or LED displays) can be projected to the user's eyes, and (2) an optical see-through mode where ambient light can pass through the near-eye display system to the user's eyes. This may be achieved by using folded optics that (1) fold light of a first polarization state (e.g., a circularly polarized light, such as left-handed circularly polarized light) from the display device, and (2) transmit (without folding) light of a second polarization state (e.g., another circularly polarized light, such as right-handed circularly polarized light) for the see-through mode, thus producing different optical powers for the display mode (e.g., a large optical power) and see-through mode (e.g., a small or close to zero optical power).

Folded-lens system 1400 described above may also be used in the see-through mode where no displayed image is projected. As shown in FIG. 14, in the see-through mode, circular polarizer 1408 and/or display 1402 (if not transparent) can be removed. The right-handed circularly polarized light from the ambient environment may pass through a transparent display (e.g., display 1402), partial reflector 1410, and reflective polarizer 1414 along an optical path 1418, and reach the user's eyes. However, as described above, left-handed circularly polarized light from the ambient environment may also pass through the transparent display (e.g., display 1402) and partial reflector 1410, and may be reflected by reflective polarizer 1414 back to partial reflector 1410. Partial reflector 1410 may then reflect the left-handed circularly polarized light into right-handed circularly polarized light towards reflective polarizer 1414, which may transmit the right-handed circularly polarized light towards the user's eye. Because the right-handed circularly polarized light passes through the cavity formed by partial reflector 1410 and reflective polarizer 1414 once, the optical power of folded-lens system 1400 for right-handed circularly polarized light may be relative small, for example, close to zero. On the other hand, the left-handed circularly polarized light may be reflected back and forth within the cavity formed by partial reflector 1410 and reflective polarizer 1414, and thus the optical power of folded-lens system 1400 for left-handed circularly polarized light may be relative large.

Thus, in the see-through mode, light of a first polarization state (e.g., left-handed circularly polarized light) and light of a second polarization state (e.g., right-handed circularly polarized light) from a same object may both reach user's eyes, but may be refracted and/or reflected with different optical powers. Therefore, the image of the ambient environment may be blurred due to the different focusing powers experienced by the light of the first polarization state and the light of the second polarization state. The brightness, contrast, and sharpness of the image may thus be decreased.

As described above, the orientation of the liquid crystal molecules in a CLC reflective circular polarizer may be aligned in a certain manner to form, for example, a cholesteric helical superstructure, where the polarization state of the light reflected by the circular polarizer may be determined by the handedness of the cholesteric helical superstructure. In many liquid crystal devices (e.g., the reflective circular polarizer described above), the orientation (or alignment) of the liquid crystal molecules can be changed or realigned by applying an voltage signal on the liquid crystal device. For example, when a voltage signal is applied to the liquid crystal device, the liquid crystal molecules of the liquid crystal device may be realigned such that the directors of the liquid crystal molecules are parallel to the electric field E, and thus the liquid crystal device may transmit light of any polarization. Therefore, a circular polarizer as described above may become transparent for light of any polarization state when a voltage signal is applied to the circular polarizer.

As such, the operation of a near-eye display device having a circular polarizer as described above may be switched between the display mode (with light reflection by the reflective circular polarizer) and the see-through mode (with no light reflection by the reflective circular polarizer) by applying voltage signals with different levels or polarities to the circular polarizer. For example, in some embodiments, when no voltage signal is applied to the reflective circular polarizer, display light may be polarized to a first circular polarization state (e.g., left-handed or right-handed) using a circular polarizer (e.g., reflective, absorptive, or beam-splitting circular polarizer). The display light of the first circular polarization state may pass through a 50/50 mirror and may then be reflected back to the 50/50 mirror by a CLC reflective circular polarizer as described above with respect to FIG. 14. The 50/50 mirror may reflect the display light of the first circular polarization state into light of a second circular polarization state (e.g., right-handed or left-handed) that can be transmitted by the reflective circular polarizer. Thus, the reflective circular polarizer may help to fold the light in the display mode to project images on an image plane. When a voltage signal is applied to the reflective circular polarizer, the liquid crystal molecules may be aligned with the electrical field, and thus light of any polarization state can pass through the reflective circular polarizer (which may become transparent to light of any polarization state by the voltage signal) without being folded. In this way, the folded-lens system described above can be used for both the display mode and the see-through mode, without compromising the quality of the image in the see-through mode.

Figure 15A:
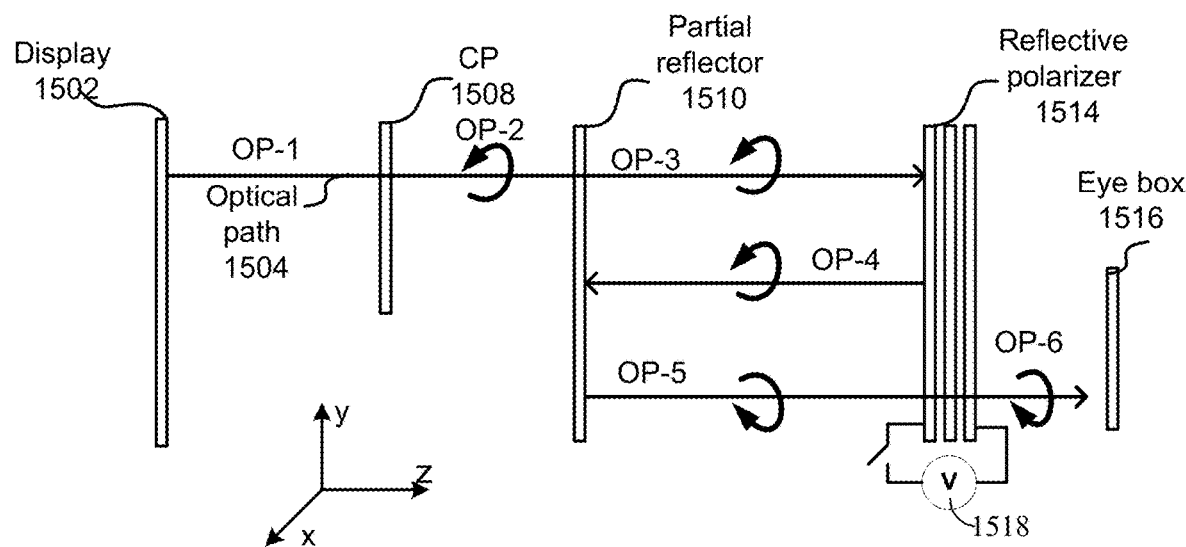
FIG. 15A illustrates an example of a folded-lens system including a reflective circular polarizer and operating in a display mode according to certain embodiments.

FIG. 15A illustrates an example of a folded-lens system 1500 including a reflective circular polarizer 1514 and operating in a display mode according to certain embodiments. Reflective circular polarizer 1514 may be a CLC circular polarizer as described above and may be controlled by a voltage source 1518. In the display mode, reflective circular polarizer 1514 may be disconnected from voltage source 1518 and thus may function as a reflective circular polarizer as described with respect to, for example, FIGS. 10-12. Light from display 1502 (which is not a part of folded-lens system 1500) and propagating on a first portion OP-1 of an optical path 1504 may be converted to circularly polarized light by a left-handed circular polarizer 1508, and become left-handed circularly polarized along a second portion OP-2 of optical path 1504. After passing through a partial reflector 1510 (e.g., a 50/50 mirror), the light remains left-handed circularly polarized along a third portion OP-3 of optical path 1504. Light from third portion OP-3 of optical path 1504 may reach reflective circular polarizer 1514.

Reflective circular polarizer 1514 may include a left-handed circular polarizer and thus may reflect left-handed circularly polarized light while transmitting right-handed circularly polarized light. The left-handed circularly polarized light reflected by reflective circular polarizer 1514 may propagate along a fourth portion OP-4 of optical path 1504 before it reaches partial reflector 1510. Partial reflector 1510 may reflect left-handed circularly polarized light into right-handed circularly polarized light as described above with respect to FIG. 12B. Right-handed circularly polarized light reflected from partial reflector 1510 may propagate along a fifth portion OP-5 of optical path 1504 and reach reflective circular polarizer 1514 again. Reflective circular polarizer 1514 is a left-handed circular polarizer and thus may transmit right-handed circularly polarized light with little or no loss. After passing through reflective circular polarizer 1514, the right-handed circularly polarized light may propagate along a sixth portion OP-6 of optical path 1504 towards an eye box 1516. Because light from display 1502 may pass through the cavity between partial reflector 1510 and reflective circular polarizer 1514 three times in the display mode, a total physical length of the system can be reduced without reducing the optical length, and a non-zero optical power can be achieved by folded-lens system 1500 to project displayed images on an image plane.

Figure 15B:
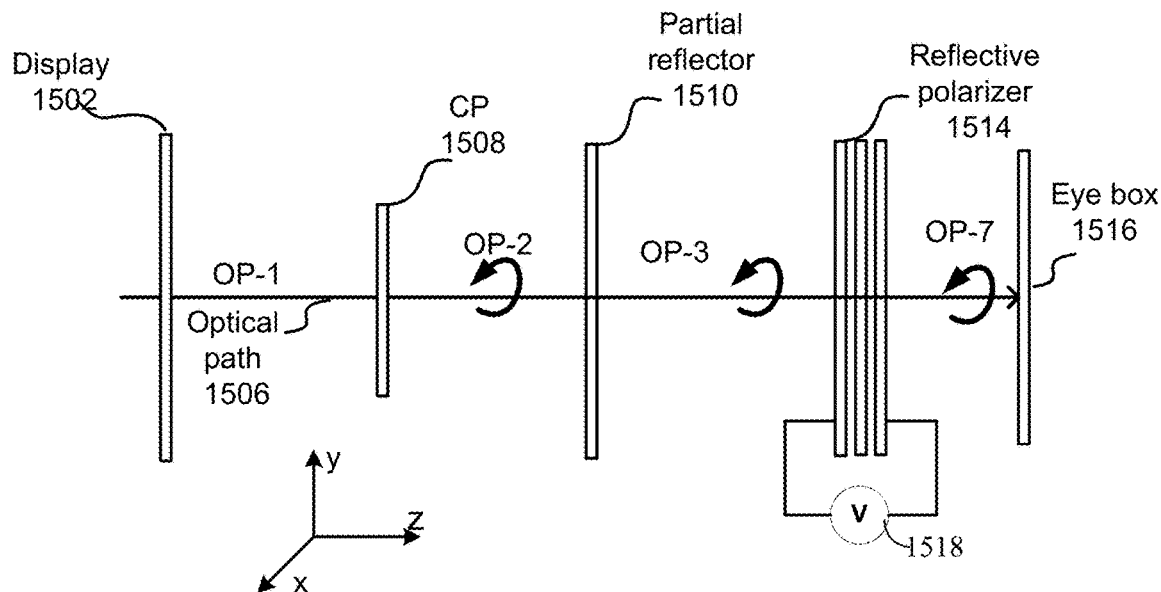
FIG. 15B illustrates an example of a folded-lens system including a reflective circular polarizer and operating in a see-through mode according to certain embodiments.

FIG. 15B illustrates an example of a folded-lens system including a reflective circular polarizer and operating in a see-through mode. In some embodiments, display 1502 may be a transparent display as described above with respect to FIG. 4 or may be a transparent liquid crystal display. In some embodiments, display 1502 may not be transparent and can be removed or displaced in the see-through mode. In the see-through mode, reflective circular polarizer 1514 may be connected to voltage source 1518 and thus may become transparent to light of any polarization state as described above. Light from ambient environment and/or passing through a transparent display (e.g., display 1502) may propagate on a first portion OP-1 of an optical path 1506, and may be converted by left-handed circular polarizer 1508 into circularly polarized light along a second portion OP-2 of optical path 1506. The polarization state of the light does not change after passing through partial reflector 1510. The left-handed circularly polarized light on a third portion OP-3 of optical path 1506 may reach reflective circular polarizer 1514. Because reflective circular polarizer 1514 may become transparent to light of any polarization state when connected to voltage source 1518, it may transmit the left-handed circularly polarized light with little or no loss towards eye box 1516. Since the light from ambient environment (and/or display 1502) may pass through the cavity between partial reflector 1510 and reflective circular polarizer 1514 once in the see-through mode, the physical length of the system may be similar to the optical length, and folded-lens system 1500 may have a relatively small optical power for ambient objects in the see-through mode. In some embodiments, folded-lens system 1500 may be configured such that the optical power of folded-lens system 1500 can help to correct the use's vision (either near-sighted or far-sighted vision). As such, folded-lens system 1500 may function as a correction lens in the see-through mode.

In various embodiments, any of circular polarizer 1508, partial reflector 1510, and reflective circular polarizer 1514 may have a flat or curved shape. For example, any of circular polarizer 1508, partial reflector 1510, and reflective circular polarizer 1514 may be formed on a flat or curved substrate. In some embodiments, any of circular polarizer 1508, partial reflector 1510, and reflective circular polarizer 1514 may be formed on a surface of a lens (e.g., a concave or convex lens) as described above with respect to FIG. 8.

In some embodiments, display 1502 may be a transparent display, such as a transparent liquid crystal display or a waveguide display as described above, and folded-lens system 1500 may function as an augmented reality, mixed-reality, or hybrid reality device that can be used to present images of both the physical world and the virtual world to the user. For example, light from the physical world in front of folded-lens system 1500 may pass through display 1502 and then propagate in a way similar to the display light from display 1502 to the user's eyes.

In some embodiments, folded-lens system 1500 may be formed on display 1502. For example, in some embodiments, display 1502 may include an output surface that can transmit light from the interior of display 1502 while reflecting light incident from the exterior of display 1502. Thus, partial reflector 1510 may not be needed and reflective circular polarizer 1514 may be formed on display 1502. Light from display 1502 may pass through the output surface and reach reflective circular polarizer 1514, which would transmit light of a first circular polarization state to user's eyes and reflect light of a second circular polarization state back to the output surface of display 1502. The reflected light of the second circular polarization state may be reflected by the output surface of display 1502 into light of the first circular polarization state back to reflective circular polarizer 1514, which would then transmit the light of the first circular polarization state from the output surface of display 1502 to the user's eyes.

In some embodiments, a cholesteric liquid crystal cell may include one reflection band. According to equation $\Delta\lambda = \Delta np = (n_e - n_o)p$, the bandwidth $\Delta\lambda$ depends on the birefringence $\Delta n$ and p at normal incidence. The larger the $\Delta n$ and p, the larger the $\Delta\lambda$. For liquid crystal materials or most colorless organic materials, $\Delta n$ can be in the range of about 0.03 to about 0.45 or higher. Therefore, $\Delta\lambda$ can be about 110 nm or higher in the visible spectrum.

Cholesteric liquid crystal materials with a high $\Delta n$ may be difficult to synthesize and may have high viscosity, low chemical and thermal stabilities, and color defect. Thus, it may be difficult to make a CLC reflective circular polarizer that can cover the visible light range by increasing the $\Delta n$ of the CLC materials. According to equation $\lambda = np$, the center wavelength of a reflection band of the CLC reflective circular polarizer may be changed by changing the average refractive index n or the pitch p of the CLC reflective circular polarizer. In some embodiments, the reflective circular polarizer may include multiple layers, where each layer may have a different pitch and may function as a reflective circular polarizer for a different wavelength range, such as red, green, blue, or infrared light. By stacking multiple CLC layers for different wavelength ranges, broadband reflection of circularly polarized light can be achieved. For example, a broadband circular polarizer for visible light may include a stack of three CLC layers that reflect circularly polarized light in red, green, and blue, respectively. The CLC layers may have different pitches in order to reflect circularly polarized light in different wavelength ranges as described above. In some embodiments, to achieve a wide reflection band, a CLC reflective circular polarizer may be fabricated such that the pitch of the CLC is changed gradually.

Figure 16:
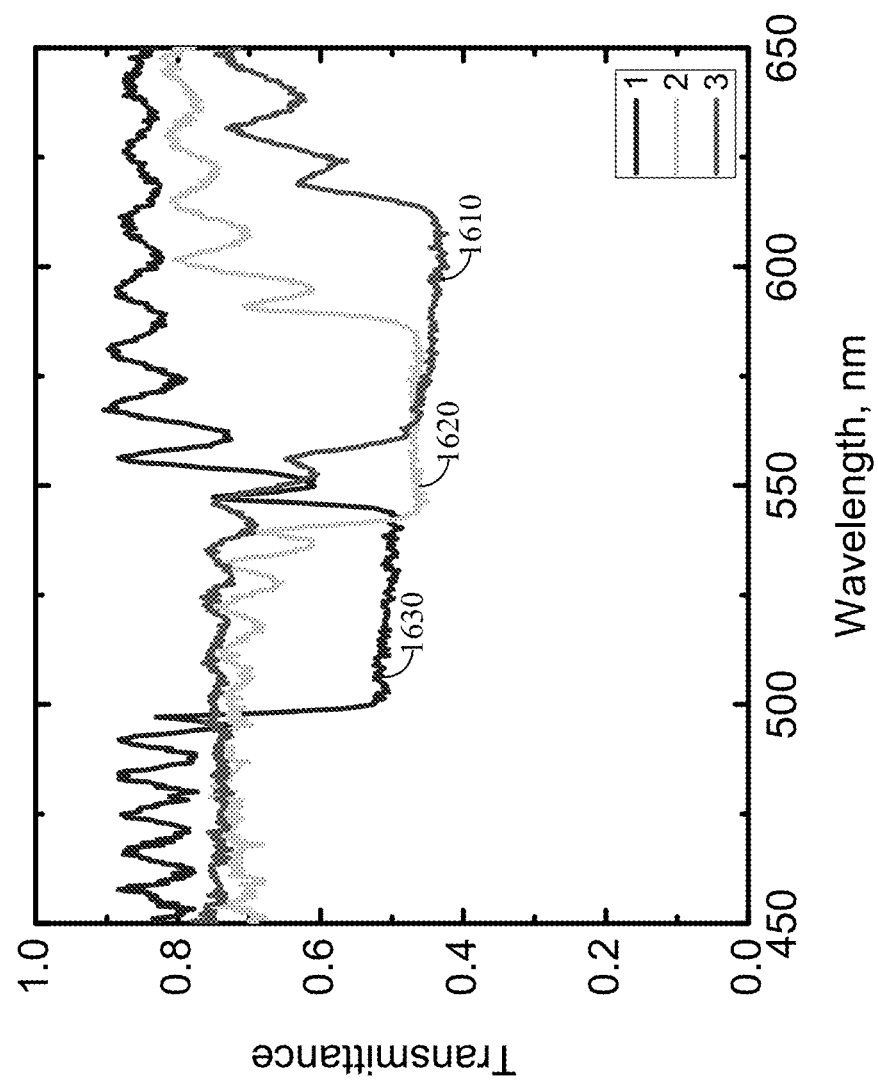
FIG. 16 illustrates transmission spectra of three examples of CLC layers.

FIG. 16 illustrates transmission spectra of three examples of cholesteric liquid crystal layers having different pitches. Curve 1610 shows the transmission spectrum of a first CLC circular polarizer layer that has a relatively high reflectivity for red light. Curve 1620 shows the transmission spectrum of a second CLC circular polarizer layer that has a relatively high reflectivity for green light. Curve 1630 shows the transmission spectrum of a third CLC circular polarizer layer that has a high reflectivity for blue light. The stack of the three CLC layers may have a relatively high reflectivity for light in a broad wavelength range. In some embodiments, circular polarizer 1508 or reflective circular polarizer 1514 may include a stack of CLC layers each functioning as a reflective circular polarizer for a different wavelength range.

In folded-lens system 1500, ambient light or light from the transparent display may be attenuated by the circular polarizer (e.g., circular polarizer 1508) in the see-through mode. In some embodiments, circular polarizer 1508 may also be implemented using a CLC circular polarizer, and the folded-lens system may be set to a display mode or a see-through mode by switching both circular polarizer 1508 and reflective circular polarizer 1514 using voltage signals. When no voltage signal is applied to circular polarizer 1508, folded-lens system 1500 may be set to the display mode, where circular polarizer 1508 may function as a circular polarizer as described above. When a voltage signal is applied to circular polarizer 1508 and turns circular polarizer 1508 into a transparent device for light of any polarization state, folded-lens system 1500 may be set to the see-through mode, where light of any polarization state can pass through circular polarizer 1508 with little to no loss. As described above, in the see-through mode, reflective circular polarizer 1514 may also be connected to voltage source 1518, and thus may become transparent to light of any polarization state with little or no loss.

VII. Folded-Lens with Switchable Optical Power in Display Mode

Additionally or alternatively, two circular polarizers and a partial reflector (e.g., a 50/50 mirror) as shown in FIGS. 15A and 15B may be used to change the optical power of a folded optical device for projecting images in different image planes. For example, when no voltage signal is applied to the circular polarizers, display light of a first circular polarization state may pass through the first circular polarizer and the 50/50 mirror, and reach the second circular polarizer. The second circular polarizer may reflect the light of the first circular polarization state back to the 50/50 mirror as described above. The 50/50 mirror may reflect the display light of the first circular polarization state into light of a second circular polarization state that can be transmitted by the second circular polarizer. Therefore, the folded optical device may fold the light of the first circular polarization state, and thus may have a first optical power for light of the first circular polarization state in the display light. When voltage signals are applied to both circular polarizers (or only the second circular polarizer), the liquid crystal molecules in the circular polarizers (or only the second circular polarizer) may be aligned with the electrical field, and thus light of any polarization state can pass through the two circular polarizers (or only the second circular polarizer) without being folded. Thus, the folded optical device may have a second optical power when the voltages signals are applied. In this way, the folded optical device may have different optical powers and may be able to relay the displayed images on different image planes.

Figure 17A:
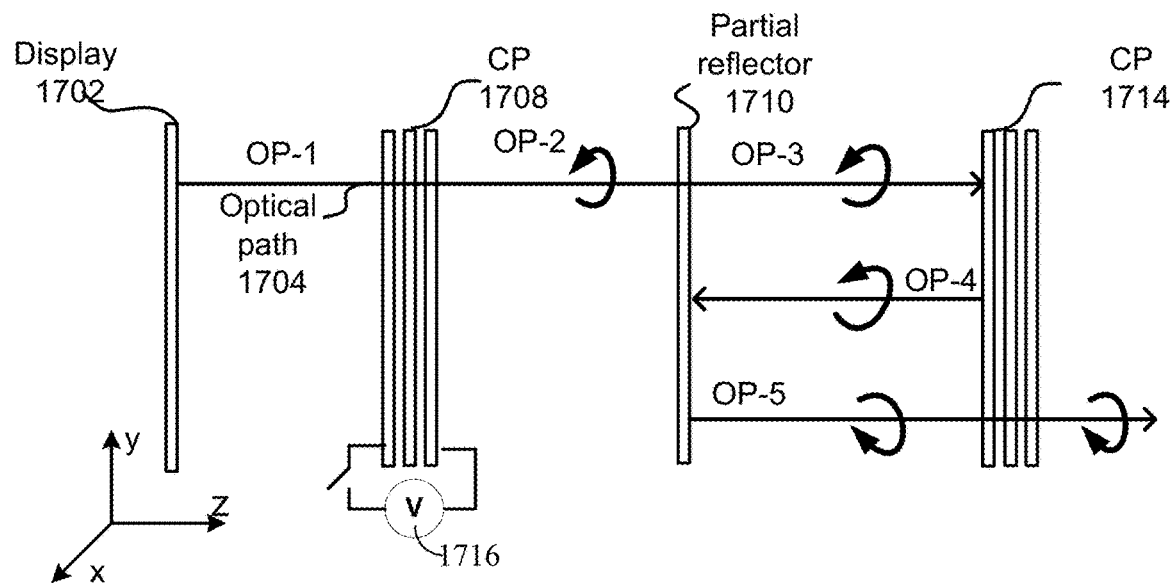
FIG. 17A illustrates an example of a folded-lens system configured to operate with a first optical power according to certain embodiments.

FIG. 17A illustrates an example of a folded-lens system 1700 configured to operate with a first optical power according to certain embodiments. Folded-lens system 1700 may project images generated by a display 1702 on different image plane. Folded-lens system 1700 may include a first circular polarizer 1708, a partial reflector 1710, and a second circular polarizer 1714. In some embodiments, first circular polarizer 1708 and/or second circular polarizer 1714 may be a reflective CLC circular polarizer and may include a stack of CLC layers each functioning as a circular polarizer for a different wavelength range as described above with respect to FIG. 16. First circular polarizer 1708 may be controlled by voltage source 1716 and may be switchable. As shown in FIG. 17A, first circular polarizer 1708 may be disconnected from voltage source 1716 and thus may function as, for example, a left-handed circular polarizer as described above. Light from display 1702 and propagating on a first portion OP-1 of optical path 1704 may be polarized by the first circular polarizer 1708 and become left-handed circularly polarized along a second portion OP-2 of optical path 1704. After passing through a partial reflector 1710 (e.g., a 50/50 mirror), the display light remains left-handed circularly polarized along a third portion OP-3 of optical path 1704. Light from third portion OP-3 of optical path 1704 may reach second circular polarizer 1714.

Second circular polarizer 1714 may include a left-handed circular polarizer and thus may reflect the left-handed circularly polarized light. The left-handed circularly polarized light reflected by second circular polarizer 1714 may propagate along a fourth portion OP-4 of optical path 1704 before it reaches partial reflector 1710. Partial reflector 1710 may reflect the left-handed circularly polarized light into right-handed circularly polarized light. The right-handed circularly polarized light reflected off partial reflector 1710 may propagate along a fifth portion OP-5 of optical path 1704 and reach second circular polarizer 1714 again. The (left-handed) second circular polarizer 1714 may then transmit the right-handed circularly polarized light with little or no loss. Because light from display 1702 may travel between partial reflector 1710 and second circular polarizer 1714 three times, folded-lens system 1700 may have a first optical power and may project the displayed images on a first image plane.

Figure 17B:
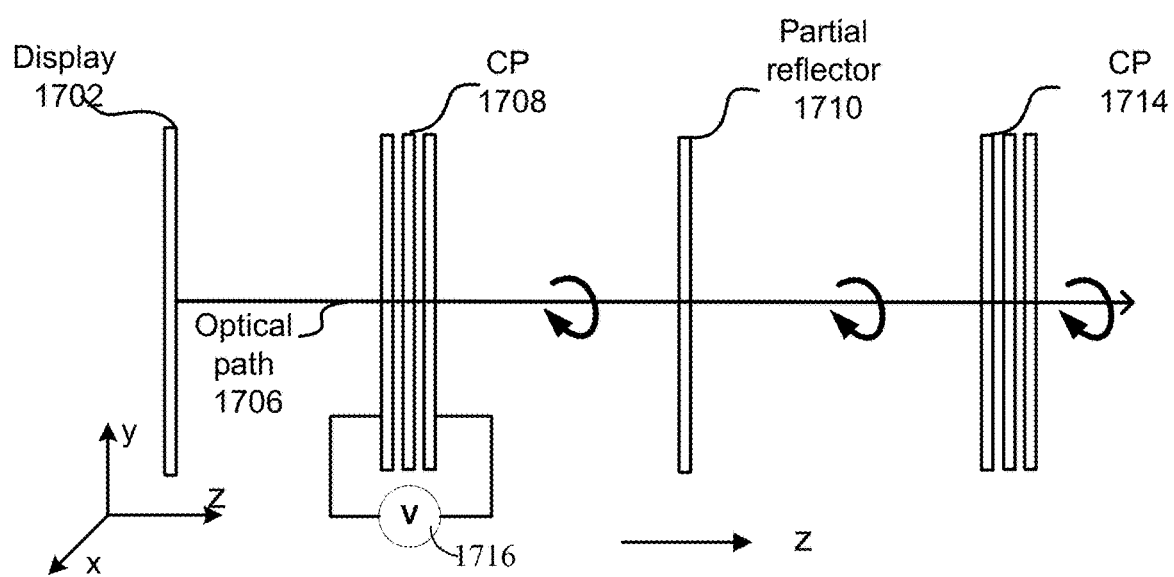
FIG. 17B illustrates an example of a folded-lens system configured to operate with a second optical power according to certain embodiments.

FIG. 17B illustrates folded-lens system 1700 that is configured to operate with a second optical power according to certain embodiments. As shown in FIG. 17B, first circular polarizer 1708 may be connected to voltage source 1716, and the electrical field applied to first circular polarizer by voltage source 1716 may change the handedness of the liquid crystal molecules such that first circular polarizer 1708 may function as a right-handed circular polarizer when the electrical field is applied. Light from display 1702 and propagating on an optical path 1706 may be circularly polarized by first circular polarizer 1708 (now right-handed), and may become right-handed circularly polarized along optical path 1706. After passing through partial reflector 1710, the display light may remain right-handed circularly polarized and may reach the left-handed second circular polarizer 1714. The (left-handed) second circular polarizer 1714 may transmit the right-handed circularly polarized display light with little or no loss. Because light from display 1702 may pass through the cavity between partial reflector 1710 and second circular polarizer 1714 once, folded-lens system 1700 may have a second optical power that is different from the first optical power and may project the displayed images on a second image plane.

In some embodiments, second circular polarizer 1714 may also be controlled by a voltage source and may be switchable. For example, when voltage signals are applied to first circular polarizer 1708 and second circular polarizer 1714, both circular polarizers may transmit light of any polarization state. Thus, folded-lens system 1700 may not fold the display light and may have a second optical power different from the first optical power described above with respect to FIG. 17A.

In various embodiments, any of first circular polarizer 1708, partial reflector 1710, and second circular polarizer 1714 may have a flat or curved shape. For example, any of first circular polarizer 1708, partial reflector 1710, and second circular polarizer 1714 may be formed on a flat or curved substrate. In some embodiments, any of first circular polarizer 1708, partial reflector 1710, and second circular polarizer 1714 may be formed on a surface of a lens (e.g., a concave or convex lens) as described above with respect to FIG. 8. Because the lens(es) on which the circular polarizers and/or the partial reflector are formed may have a non-zero optical power, two non-zero optical powers of different values may be achieved by switching the circular polarizer(s) for projecting the displayed images on two different image planes. In some embodiments, multiple switchable circular polarizers may be used to set the optical power of the folded-lens system to one of multiple values, and thus the display images may be projected on one of multiple image planes.

VIII. Example Method

Figure 18:
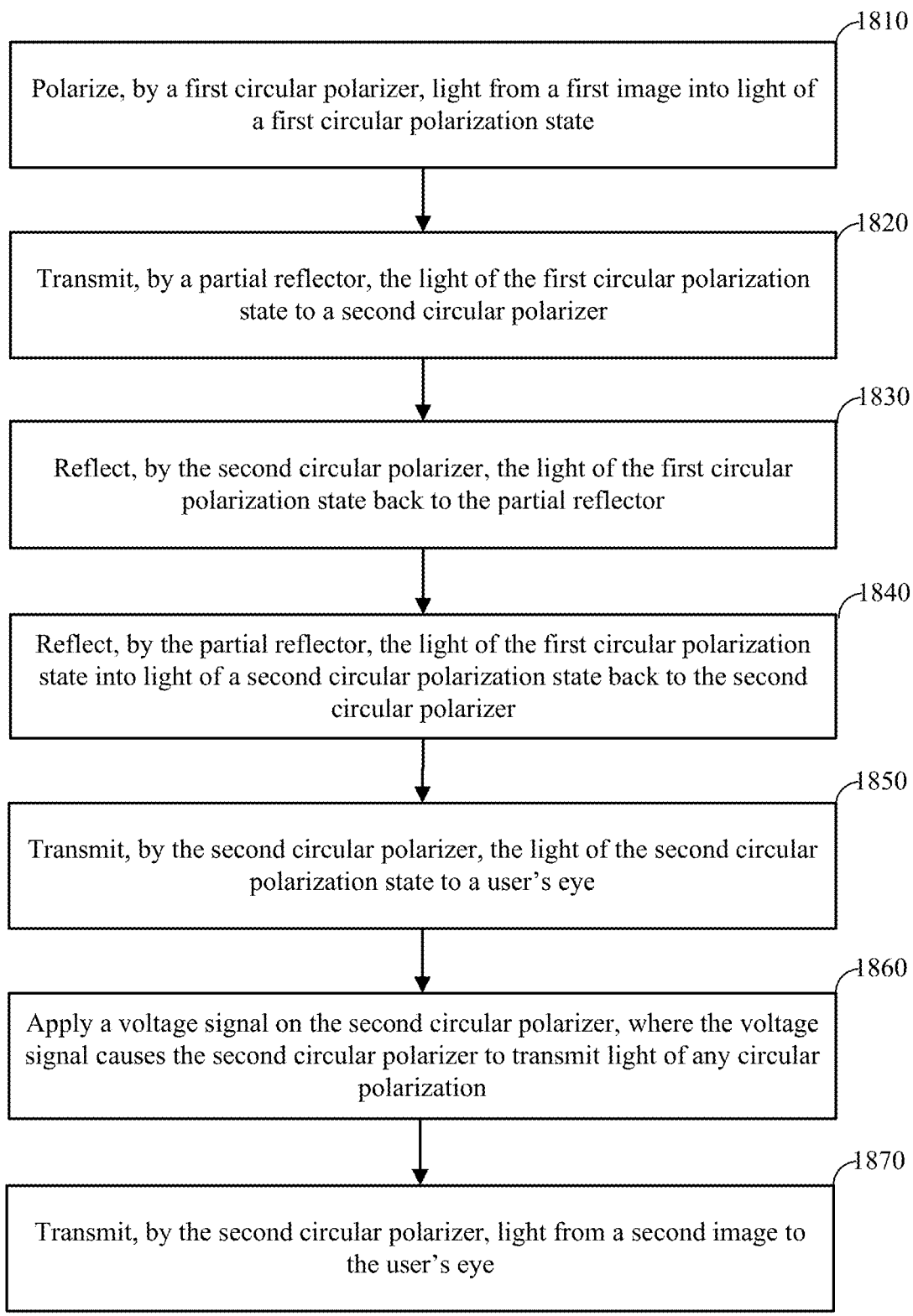
FIG. 18 is a simplified flow chart illustrating an example of a method of displaying images at multiple image planes using a switchable circular polarizer according to certain embodiments.

FIG. 18 is a simplified flow chart 1800 illustrating an example of a method of displaying images at multiple image planes using one or more switchable circular polarizers according to certain embodiments. The operations described in flow chart 1800 are for illustration purposes only and are not intended to be limiting. In various implementations, modifications may be made to flow chart 1800 to add additional operations, omit some operations, combine some operations, split some operations, or reorder some operations. The operations described in flow chart 1800 may be performed using, for example, folded-lens system 800, 1400, 1500, or 1700 described above.

At block 1810, a first circular polarizer (e.g., circular polarizer 1508 or first circular polarizer 1708) of a folded-lens system may polarize light from a first displayed image into light of a first circular polarization state (e.g., left-handed circular polarization). The first circular polarizer may or may not be a reflective circular polarizer. For example, in some embodiments, the first circular polarizer may be a CLC reflective circular polarizer as described above. In some embodiments, the first circular polarizer may be an absorptive circular polarizer or a different type of reflective circular polarizer.

At block 1820, a partial reflector (e.g., partial reflector 1510 or 1710) of the folded-lens system may transmit the light of the first circular polarization state to a second circular polarizer. In some embodiments, the partial reflector may include a 50/50 mirror. In some embodiments, the partial reflector may transmit light incident from one direction and reflect light incident from another direction. In some embodiments, the partial reflector may include a metal or glass reflector. The partial reflector may reflect polarized light and change the polarization state of the reflected light relative to the polarization state of the incident light.

At block 1830, the second circular polarizer (e.g., reflective polarizer 1514 or second circular polarizer 1714) of the folded-lens system may reflect the light of the first circular polarization state back to the partial reflector. In some embodiments, the second circular polarizer may include a CLC reflective circular polarizer as described above. The second circular polarizer may reflect the light of the first circular polarization state (e.g., left-handed circular polarization) without changing the handedness of the reflected light, and may transmit light of the opposite circular polarization state (e.g., right-handed circular polarization) without changing the handedness of the transmitted light.

At block 1840, the partial reflector may reflect the light of the first circular polarization state into light of a second circular polarization state back to the second circular polarizer. For example, if the light of the first circular polarization state is left-handed circularly polarized, the light reflected off the partial reflector may be right-handed circularly polarized.

At block 1850, the second circular polarizer may transmit the light of the second circular polarization state to a user's eye. For example, the second circular polarizer may include left-handed CLC helixes and may function as a left-handed reflective circular polarizer that can transmit right-handed circularly polarized light with little or no loss. Because the light from the first image travels in the cavity between the partial reflector and the second circular polarizer three times, the optical path for the light from the first image may be longer than the physical path of the folded-lens system. Thus, the folded-lens system may have a large optical power and may relay the first image to a first image plane.

At block 1860, a voltage source may apply a voltage signal on the second circular polarizer. The voltage signal may cause the second circular polarizer to transmit light of any circular polarization. For example, as described above, the electric field applied to the second circular polarizer by the voltage source may realign the liquid crystal molecules in the CLC circular polarizer with the direction of the electric field and disrupt the helical structure, and thus the second circular polarizer may become transparent to light of any polarization state.

At block 1870, the second circular polarizer may transmit light from a second image to the user's eye. In some embodiments, the first circular polarizer may polarize the light from the second image into light of the first circular polarization state; the partial reflector may transmit the light of the first circular polarization state in the light from the second image to the second circular polarizer; and the second circular polarizer (transparent to light of any polarization state after receiving the voltage signal) may transmit the light of the first circular polarization state in the light from the second image to the user's eye. In some embodiments, a second voltage source may apply a second voltage signal on the first circular polarizer, where the second voltage signal may cause the first circular polarizer to become transparent to light of any circular polarization state. Thus, the first circular polarizer and the partial reflector may transmit the light in any polarization state from the second image to the second circular polarizer, which may transmit light of any circular polarization state from the second image to the user's eye. In either case, the light from the second image may travel in the cavity between the partial reflector and the second circular polarizer only once, and the optical path for the light from the second image may be similar to the physical path of the folded-lens system. Thus, the folded-lens system may have a small optical power and may relay the second image to a second image plane different from the first image plane.

Figure 19:
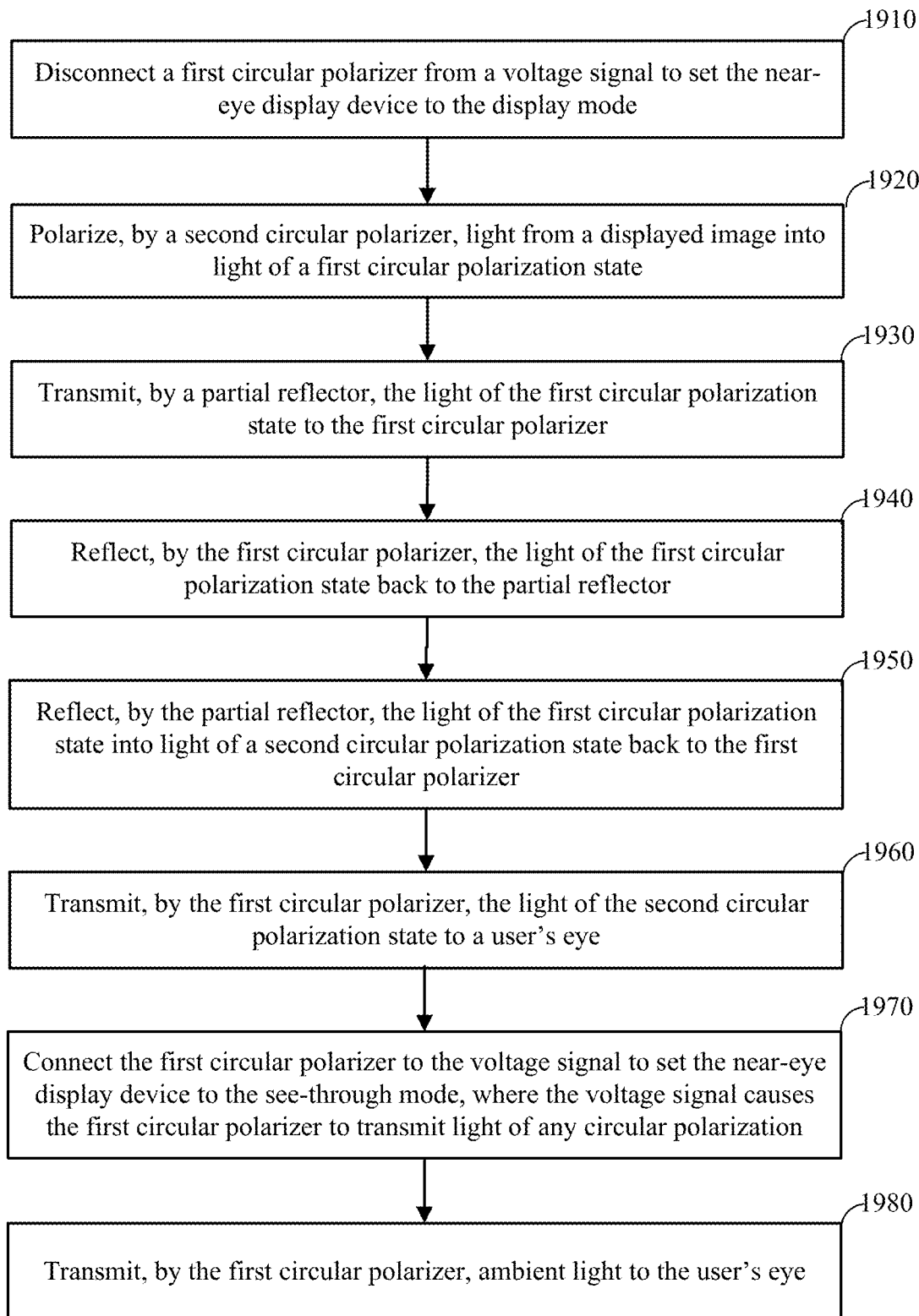
FIG. 19 is a simplified flow chart illustrating an example of a method of operating a near-eye display device in a display mode and a see-through mode according to certain embodiments.

FIG. 19 is a simplified flow chart 1900 illustrating an example of a method of operating a near-eye display device in a display mode and a see-through mode according to certain embodiments. The operations described in flow chart 1900 are for illustration purposes only and are not intended to be limiting. In various implementations, modifications may be made to flow chart 1900 to add additional operations, omit some operations, combine some operations, split some operations, or reorder some operations. The operations described in flow chart 1900 may be performed using, for example, folded-lens system 800, 1400, 1500, or 1700 described above.

At block 1910, a first circular polarizer (e.g., reflective polarizer 1514 or second circular polarizer 1714) of a folded-lens system (e.g., folded-lens system 1500 or 1700) in the near-eye display device may be disconnected from a voltage signal to set the near-eye display device to the display mode. As described above, the first circular polarizer may include a CLC reflective circular polarizer that includes a CLC helical structure when no voltage signal is applied to it. The circular polarization capability of the first circular polarizer may be disabled when a voltage signal is applied to it to realign the liquid crystal molecules and disrupt the helical structure. When no voltage signal is applied, the first circular polarizer may reflect light of a first circular polarization state (e.g., right-handed circular polarization if the helical structure is right-handed) without changing the polarization state of the reflected light, and may transmit light of a second circular polarization state (e.g., left-handed circular polarization) without changing the polarization state of the transmitted light.

At block 1920, a second circular polarizer (e.g., circular polarizer 1508 or first circular polarizer 1708) of the folded-lens system may polarize light from a displayed image into light of a first circular polarization state (e.g., right-handed circular polarization). In some embodiments, the first circular polarizer may be a CLC reflective circular polarizer as described above. In some embodiments, the first circular polarizer may be an absorptive circular polarizer or a different type of reflective circular polarizer.

At block 1930, a partial reflector (e.g., partial reflector 1510 or 1710) of the folded-lens system may transmit the light of the first circular polarization state to the first circular polarizer. In some embodiments, the partial reflector may include a 50/50 mirror. In some embodiments, the partial reflector may transmit light incident from one direction and reflect light incident from another direction. In some embodiments, the partial reflector may include a metal or glass reflector. The partial reflector may reflect polarized light and change the polarization state of the reflected light relative to the polarization state of the incident light.

At block 1940, the first circular polarizer may reflect the light of the first circular polarization state back to the partial reflector. For example, if the light of the first circular polarization state is right-handed circularly polarized, the light reflected off the first circular polarizer may also be right-handed circularly polarized.

At block 1950, the partial reflector may reflect the light of the first circular polarization state into light of a second circular polarization state back to the first circular polarizer. For example, if the light of the first circular polarization state is right-handed circularly polarized, the light reflected off the partial reflector may be left-handed circularly polarized.

At block 1960, the first circular polarizer may transmit the light of the second circular polarization state to a user's eye. For example, the first circular polarizer may be a right-handed circular polarizer and may transmit the left-handed circularly polarized light reflected off the partial reflector to user's eye. Because the light from the displayed image travels in the cavity between the partial reflector and the first circular polarizer three times in the display mode, the folded-lens system may have a large optical power and may relay the displayed image to an image plane.

At block 1970, the first circular polarizer may be connected to the voltage signal, where the voltage signal may cause the first circular polarizer to transmit light of any circular polarization state and thus set the near-eye display device to the see-through mode. For example, as described above, the electric field applied in the first circular polarizer by the voltage signal may realign the liquid crystal molecules in the CLC circular polarizer with the direction of the electric field and disrupt the helical structure, and thus the first circular polarizer may become transparent to light of any polarization state.

At block 1980, the first circular polarizer may transmit ambient light to the user's eye. In some embodiments, the second circular polarizer may polarize the ambient light into light of the first circular polarization state, the partial reflector may transmit the light of the first circular polarization state in the ambient light to the first circular polarizer, and the first circular polarizer may then transmit the light of the first circular polarization state in the ambient light to the user's eye. In some embodiments, a second voltage signal may be applied on the second circular polarizer, where the second voltage signal may disrupt the helical structure and cause the second circular polarizer to become transparent to light of any circular polarization state. Thus, the second circular polarizer and the partial reflector may transmit ambient light of any circular polarization state to the first circular polarizer, and the first circular polarizer may then transmit the ambient light of any circular polarization state to the user's eye. Therefore, in the see-through mode, the ambient light may travel through the cavity between the partial reflector and the second circular polarizer only once, and thus the folded-lens system may have a small or near-zero optical power for ambient light.

Embodiments of the invention may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

IX. Example System

Figure 20:
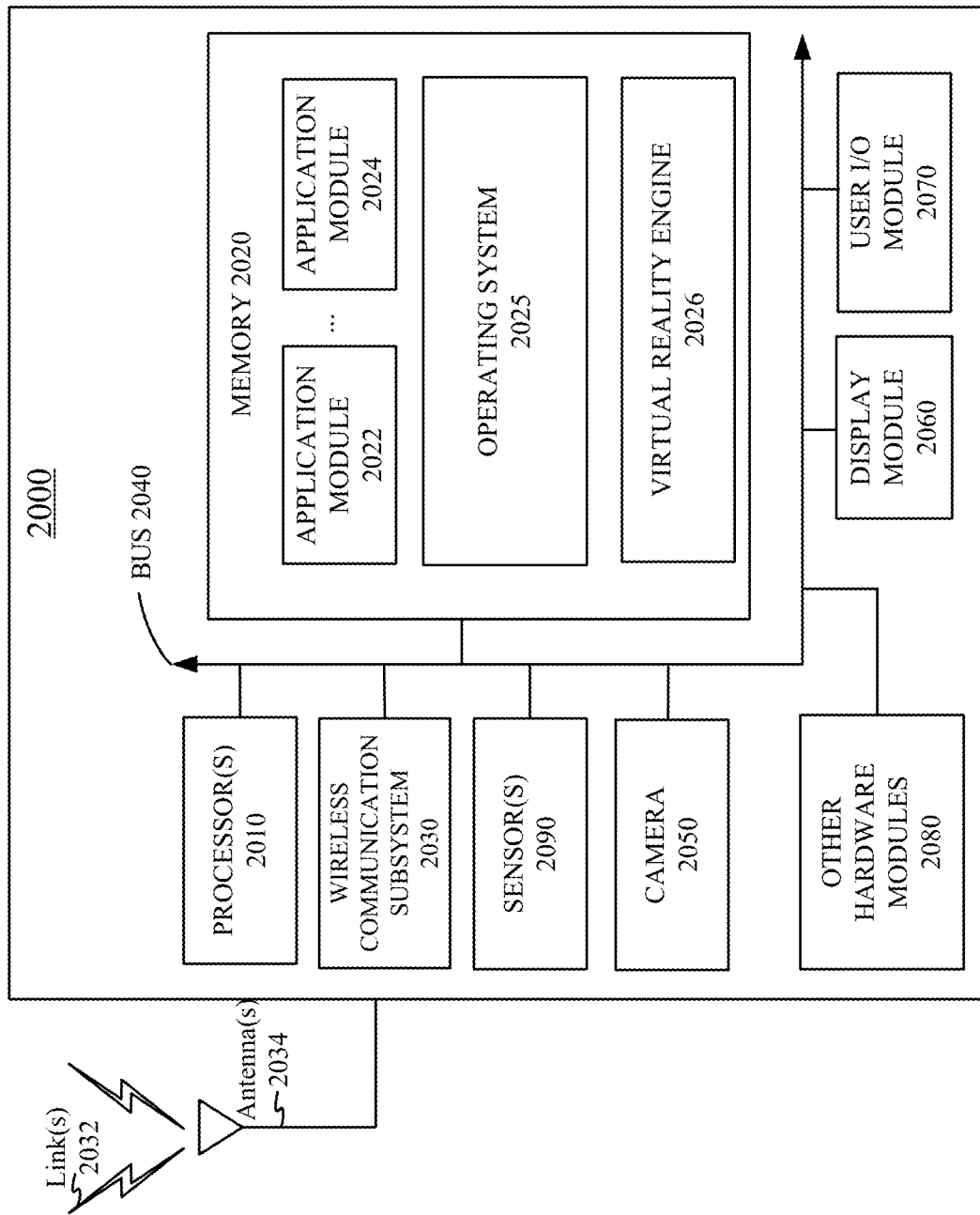
FIG. 20 is a simplified block diagram of an example of an electronic system of a near-eye display according to certain embodiments.

FIG. 20 is a simplified block diagram of an example of an electronic system 2000 of a near-eye display (e.g., HMD device) for implementing some of the examples disclosed herein. Electronic system 2000 may be used as the electronic system of an HMD device or other near-eye displays described above. In this example, electronic system 2000 may include one or more processor(s) 2010 and a memory 2020. Processor(s) 2010 may be configured to execute instructions for performing operations at a number of components, and can be, for example, a general-purpose processor or microprocessor suitable for implementation within a portable electronic device. Processor(s) 2010 may be communicatively coupled with a plurality of components within electronic system 2000. To realize this communicative coupling, processor(s) 2010 may communicate with the other illustrated components across a bus 2040. Bus 2040 may be any subsystem adapted to transfer data within electronic system 2000. Bus 2040 may include a plurality of computer buses and additional circuitry to transfer data.

Memory 2020 may be coupled to processor(s) 2010. In some embodiments, memory 2020 may offer both short-term and long-term storage and may be divided into several units. Memory 2020 may be volatile, such as static random access memory (SRAM) and/or dynamic random access memory (DRAM) and/or non-volatile, such as read-only memory (ROM), flash memory, and the like. Furthermore, memory 2020 may include removable storage devices, such as secure digital (SD) cards. Memory 2020 may provide storage of computer-readable instructions, data structures, program modules, and other data for electronic system 2000. In some embodiments, memory 2020 may be distributed into different hardware modules. A set of instructions and/or code might be stored on memory 2020. The instructions might take the form of executable code that may be executable by electronic system 2000, and/or might take the form of source and/or installable code, which, upon compilation and/or installation on electronic system 2000 (e.g., using any of a variety of generally available compilers, installation programs, compression/decompression utilities, etc.), may take the form of executable code.

In some embodiments, memory 2020 may store a plurality of application modules 2022 through 2024, which may include any number of applications. Examples of applications may include gaming applications, conferencing applications, video playback applications, or other suitable applications. The applications may include a depth sensing function or eye tracking function. Application modules 2022-2024 may include particular instructions to be executed by processor(s) 2010. In some embodiments, certain applications or parts of application modules 2022-2024 may be executable by other hardware modules 2080. In certain embodiments, memory 2020 may additionally include secure memory, which may include additional security controls to prevent copying or other unauthorized access to secure information.

In some embodiments, memory 2020 may include an operating system 2025 loaded therein. Operating system 2025 may be operable to initiate the execution of the instructions provided by application modules 2022-2024 and/or manage other hardware modules 2080 as well as interfaces with a wireless communication subsystem 2030 which may include one or more wireless transceivers. Operating system 2025 may be adapted to perform other operations across the components of electronic system 2000 including threading, resource management, data storage control and other similar functionality.

Wireless communication subsystem 2030 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2000 may include one or more antennas 2034 for wireless communication as part of wireless communication subsystem 2030 or as a separate component coupled to any portion of the system. Depending on desired functionality, wireless communication subsystem 2030 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2030 may permit data to be exchanged with a network, other computer systems, and/or any other devices described herein. Wireless communication subsystem 2030 may include a means for transmitting or receiving data, such as identifiers of HMD devices, position data, a geographic map, a heat map, photos, or videos, using antenna(s) 2034 and wireless link(s) 2032. Wireless communication subsystem 2030, processor(s) 2010, and memory 2020 may together comprise at least a part of one or more of a means for performing some functions disclosed herein.

Embodiments of electronic system 2000 may also include one or more sensors 2090. Sensor(s) 2090 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2090 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2000 may include a display module 2060. Display module 2060 may be a near-eye display, and may graphically present information, such as images, videos, and various instructions, from electronic system 2000 to a user. Such information may be derived from one or more application modules 2022-2024, virtual reality engine 2026, one or more other hardware modules 2080, a combination thereof, or any other suitable means for resolving graphical content for the user (e.g., by operating system 2025). Display module 2060 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 2000 may include a user input/output module 2070. User input/output module 2070 may allow a user to send action requests to electronic system 2000. An action request may be a request to perform a particular action. For example, an action request may be to start or end an application or to perform a particular action within the application. User input/output module 2070 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2000. In some embodiments, user input/output module 2070 may provide haptic feedback to the user in accordance with instructions received from electronic system 2000. For example, the haptic feedback may be provided when an action request is received or has been performed.

Electronic system 2000 may include a camera 2050 that may be used to take photos or videos of a user, for example, for tracking the user's eye position. Camera 2050 may also be used to take photos or videos of the environment, for example, for VR, AR, or MR applications. Camera 2050 may include, for example, a complementary metal-oxide-semiconductor (CMOS) image sensor with a few millions or tens of millions of pixels. In some implementations, camera 2050 may include two or more cameras that may be used to capture 3-D images.

In some embodiments, electronic system 2000 may include a plurality of other hardware modules 2080. Each of other hardware modules 2080 may be a physical module within electronic system 2000. While each of other hardware modules 2080 may be permanently configured as a structure, some of other hardware modules 2080 may be temporarily configured to perform specific functions or temporarily activated. Examples of other hardware modules 2080 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2080 may be implemented in software.

In some embodiments, memory 2020 of electronic system 2000 may also store a virtual reality engine 2026. Virtual reality engine 2026 may execute applications within electronic system 2000 and receive position information, acceleration information, velocity information, predicted future positions, or some combination thereof of the HMD device from the various sensors. In some embodiments, the information received by virtual reality engine 2026 may be used for producing a signal (e.g., display instructions) to display module 2060. For example, if the received information indicates that the user has looked to the left, virtual reality engine 2026 may generate content for the HMD device that mirrors the user's movement in a virtual environment. Additionally, virtual reality engine 2026 may perform an action within an application in response to an action request received from user input/output module 2070 and provide feedback to the user. The provided feedback may be visual, audible, or haptic feedback. In some implementations, processor(s) 2010 may include one or more GPUs that may execute virtual reality engine 2026.

In various implementations, the above-described hardware and modules may be implemented on a single device or on multiple devices that can communicate with one another using wired or wireless connections. For example, in some implementations, some components or modules, such as GPUs, virtual reality engine 2026, and applications (e.g., tracking application), may be implemented on a console separate from the head-mounted display device. In some implementations, one console may be connected to or support more than one HMD.

In alternative configurations, different and/or additional components may be included in electronic system 2000. Similarly, functionality of one or more of the components can be distributed among the components in a manner different from the manner described above. For example, in some embodiments, electronic system 2000 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A folded lens system comprising:
a lens;
a partial reflector; and
a reflective circular polarizer,
wherein:
at least one of the partial reflector or the reflective circular polarizer is coupled to a surface of the lens;
the partial reflector is configured to transmit light in a first circular polarization state from a front side of the partial reflector to the reflective circular polarizer on a back side of the partial reflector;
the reflective circular polarizer is configured to reflect the light in the first circular polarization state from the partial reflector back to the partial reflector and maintain the first circular polarization state of the reflected light;
the partial reflector is further configured to reflect the light in the first circular polarization state and reflected from the reflective circular polarizer back to the reflective circular polarizer as light in a second circular polarization state; and
the reflective circular polarizer is further configured to transmit the light in the second circular polarization state and reflected by the partial reflector and maintain the second circular polarization state of the transmitted light.

2. The folded lens system of claim 1, wherein the reflective circular polarizer includes a cholesteric liquid crystal (CLC) circular polarizer.

3. The folded lens system of claim 2, wherein the CLC circular polarizer includes a plurality of layers, each layer of the plurality of layers configured to reflect light in a different respective wavelength range and in the first circular polarization state.

4. The folded lens system of claim 3, wherein each of the plurality of layers includes liquid crystal molecules arranged in a helical structure, the helical structure in each of the plurality of layers having a different respective pitch.

5. The folded lens system of claim 3, wherein at least two layers of the plurality of layers are doped with different respective chiral dopant materials.

6. The folded lens system of claim 3, wherein at least two layers of the plurality of layers are doped with a chiral dopant material at different respective dopant concentrations.

7. The folded lens system of claim 2, wherein the CLC circular polarizer includes liquid crystal molecules arranged in a helical structure, and wherein a pitch of the helical structure varies along a thickness direction of the CLC circular polarizer.

8. The folded lens system of claim 2, wherein the CLC circular polarizer, upon receiving a voltage signal, transmits both the light in the first circular polarization state and the light in the second circular polarization state.

9. The folded lens system of claim 2, wherein the CLC circular polarizer includes liquid crystal molecules arranged in a left-handed or a right-handed cholesteric helical structure.

10. The folded lens system of claim 9, wherein the liquid crystal molecules are configured to align with an electrical field in the CLC circular polarizer.

11. The folded lens system of claim 1, further comprising an input circular polarizer on the first front side of the partial reflector, wherein the input circular polarizer is configured to polarize light incident on the input circular polarizer into the light in the first circular polarization state.

12. The folded lens system of claim 11, wherein the input circular polarizer includes a first CLC helical structure in a first handedness.

13. The folded lens system of claim 12, wherein the reflective circular polarizer includes a second CLC helical structure in a second handedness different from the first handedness.

14. The folded lens system of claim 11, wherein the input circular polarizer, upon receiving a voltage signal, transmits both the light in the first circular polarization state and the light in the second circular polarization state.

15. The folded lens system of claim 11, further comprising a light source configured to generate the light incident on the input circular polarizer.

16. An optical device comprising:
a partial reflector; and
a reflective circular polarizer,
wherein:
the partial reflector is configured to transmit light in a first circular polarization state from a front side of the partial reflector to the reflective circular polarizer on a back side of the partial reflector;
the reflective circular polarizer is configured to reflect the light in the first circular polarization state from the partial reflector back to the partial reflector and maintain the first circular polarization state of the reflected light;
the partial reflector is further configured to reflect the light in the first circular polarization state and reflected from the reflective circular polarizer back to the reflective circular polarizer as light in a second circular polarization state; and the reflective circular polarizer is further configured to transmit the light in the second circular polarization state and reflected by the partial reflector and maintain the second circular polarization state of the transmitted light.

17. The optical device of claim 16, wherein the reflective circular polarizer includes a plurality of layers, each layer in the plurality of layers configured to reflect light in a different respective wavelength range.

18. The optical device of claim 17, wherein each of the plurality of layers includes liquid crystal molecules arranged in a helical structure, the helical structure in each of the plurality of layers having a different respective pitch.

19. The optical device of claim 16, further comprising a refractive optical component, wherein the refractive optical component and the partial reflector are on a same side of the reflective circular polarizer.

20. The optical device of claim 16, wherein the reflective circular polarizer includes a cholesteric liquid crystal circular polarizer that, upon receiving a voltage signal, transmits both the light in the first circular polarization state and the light in the second circular polarization state.

* * * * *